(12) United States Patent
White et al.

(10) Patent No.: US 9,457,338 B2
(45) Date of Patent: *Oct. 4, 2016

(54) POLYSACCHARIDE DERIVED MATERIALS

(71) Applicant: THE UNIVERSITY OF YORK, York North Yorkshire (GB)

(72) Inventors: Robin Jeremy White, Whitchurch (GB); James Hanley Clark, York North Yorkshire (GB); Vitaliy L'vovich Budarin, York North Yorkshire (GB); Duncan James MacQuarrie, York North Yorkshire (GB)

(73) Assignee: THE UNIVERSITY OF YORK, York North Yorkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,286

(22) Filed: Dec. 23, 2013

(65) Prior Publication Data
US 2014/0288297 A1 Sep. 25, 2014

Related U.S. Application Data

(62) Division of application No. 12/679,037, filed as application No. PCT/EP2008/062584 on Sep. 19, 2008, now abandoned.

(30) Foreign Application Priority Data

Sep. 19, 2007 (GB) .................................. 0718263.7

(51) Int. Cl.
| | | |
|---|---|---|
| C01B 31/02 | (2006.01) |
| B01J 20/20 | (2006.01) |
| B01J 20/28 | (2006.01) |
| B01J 20/282 | (2006.01) |
| B01J 20/30 | (2006.01) |
| C01B 31/00 | (2006.01) |
| C04B 38/00 | (2006.01) |
| C08J 9/28 | (2006.01) |
| C08L 1/02 | (2006.01) |
| C08L 3/12 | (2006.01) |
| C08L 5/00 | (2006.01) |
| C08L 5/04 | (2006.01) |
| C08L 5/06 | (2006.01) |
| C08L 5/08 | (2006.01) |

(52) U.S. Cl.
CPC ............... *B01J 20/20* (2013.01); *B01J 20/282* (2013.01); *B01J 20/2808* (2013.01); *B01J 20/28083* (2013.01); *B01J 20/3078* (2013.01); *C01B 31/00* (2013.01); *C01B 31/02* (2013.01); *C04B 38/0022* (2013.01); *C08J 9/28* (2013.01); *C08L 1/02* (2013.01); *C08L 3/12* (2013.01); *C08L 5/00* (2013.01); *C08L 5/04* (2013.01); *C08L 5/06* (2013.01); *C08L 5/08* (2013.01); *B01J 2220/54* (2013.01); *C08J 2305/00* (2013.01); *C08L 2205/02* (2013.01)

(58) Field of Classification Search
CPC ...................................................... C01B 31/02
See application file for complete search history.

(56) References Cited

U.S. PATENT DOCUMENTS

| | | | |
|---|---|---|---|
| 3,135,739 A | 6/1964 | Hjermstad et al. | |
| 4,937,223 A * | 6/1990 | Yamaguchi | 502/427 |
| 5,958,589 A | 9/1999 | Glenn et al. | |
| 5,990,041 A | 11/1999 | Chung et al. | |
| 6,812,187 B1 | 11/2004 | Pak | |
| 8,227,376 B2 * | 7/2012 | Karles et al. | 502/404 |
| 8,790,548 B2 | 7/2014 | Budarin et al. | |
| 2003/0094172 A1 | 5/2003 | Bengs | |
| 2005/0169829 A1 | 8/2005 | Dai | |
| 2005/0207962 A1 | 9/2005 | Dietz | |
| 2005/0252373 A1 | 11/2005 | Shiflett et al. | |
| 2006/0272548 A1 | 12/2006 | Yoshida et al. | |
| 2007/0116624 A1 | 5/2007 | Joo et al. | |
| 2009/0078913 A1 | 3/2009 | Luque et al. | |
| 2011/0028708 A1 | 2/2011 | White et al. | |

FOREIGN PATENT DOCUMENTS

| | | |
|---|---|---|
| EP | 1369441 | 12/2003 |
| EP | 1615279 | 1/2006 |
| WO | 02053598 | 7/2002 |
| WO | 2005011836 | 2/2005 |
| WO | 2007088163 | 8/2007 |
| WO | 2007099989 | 9/2007 |
| WO | 2007104798 | 9/2007 |
| WO | 2007126118 | 11/2007 |
| WO | 2009037354 | 3/2009 |

OTHER PUBLICATIONS

Sriamornsak et al., 'Calcium Pectinate Gel Beads for Controlled Release Drug Delivery: I Preparation and in Vitro Release Studies' in Int. J. of Pharmacuetics vol. 160 pp. 207-212 1998.*
International Search Report and Written Opinion dated Mar. 9, 2009 in Application No. PCT/EP2008/062584.
Search report dated Feb. 14, 2008 in Application No. GB0718263.7.
Final Office Action dated Jul. 25, 2013 in U.S. Appl. No. 12/679,037.
Office Action dated Jan. 9, 2013 in U.S. Appl. No. 12/679,037.
Office Action dated Nov. 9, 2012 in U.S. Appl. No. 12/679,037.
Antonio et al., "Development and Application of LC-MS Approaches for Studying the Plant Primary Metabolome", A thesis submitted for the degree of Doctor of Philosophy at the University of York,, May 2008, pp. 1-256.
Antonio et al., "Quantification of sugars and sugar phosphates in Arabidopsis thaliana tissues using porous graphite carbon liquid chromatography-electrospray ionization mass spectrometry", Journal of Chromatography A., vol. 1172, No. 2, Oct. 10, 2007, pp. 170-178.

(Continued)

*Primary Examiner* — Stuart Hendrickson
(74) *Attorney, Agent, or Firm* — Kilpatrick Townsend & Stockton LLP

(57) ABSTRACT

A mesoporous material is derived from a polysaccharide by thermally assisted partial carbonisation after expansion. The polysaccharide is an acid containing polysaccharide or mixture of polysaccharides.

29 Claims, 21 Drawing Sheets

(56) References Cited

OTHER PUBLICATIONS

Budarin et al., "Starbons: New Starch-Derived Mesoporous Carbonaceous Materials with Tunable Properties", Angew. Chem. Int. Ed., 2006, 45 Wiley-VCH Verlag GmbH &co. KGaA, Welnheim 2007, 2006, 3782-3786.

Budarin et al., "Towards a bio-based industry: Benign catalytic esterifications of succinic acid in the presence of water", Chem. Eur. J., 2007 Wiley-VCH Verlaa GmbH & Co., KGaA, Weinheim, 2007, vol. 13 No. 24, pp. 6914-69919.

Budarin et al., "Versatile mesoporous carbonaceous materials for acid catalysis", Chem. Commun.1 First published as an Advance Article on the web 11/1412006, 2007, 634-636.

Clark et al., "Green Chemistry: today (and tomorrow)", Green Chemistry, Royal Society of Chemistry, First published as an Advance Article on the web Dec. 2, 2005, 2006, vol. 8 No. 1, pp. 17-21.

Hanai, "Separation of polar compounds using carbon columns", Journal of Chromatography, A989, 2003, 183-196.

Kachkarova et al., "A novel clean catalytic method for waste-free modification of polysaccharides by oxidation", Chern. Comm., 2004, pp. 2844-2845.

Knox et al., "Structure and Performance of Porous Graphitic Carbon in Liquid chromatography", Journal of Chromatoaraohv, 1986, 352:3-25.

Liu et al., "Synthesis of macroscopically long ropes of well-aligned single-walled carbon nanotubes", Advanced Materials 12.16 (2000): 1190-1192.

Matisova et al., "Novel Porous Carbons and their Utilization in Trace Analysis", Chem. Papers, 1999, vol. 53 No. 1:40-48.

Su et al., "Self-organization of triple-stranded carbon nanoropes", PhysChemComm 5.5 (2002): 34-36.

Office Communication dated Sep. 19, 2013 in European Patent Application No. 08804512.5.

European Patent Application No. 07726967.8, Office Action, mailed on Dec. 17, 2010, 8 pages.

U.S. Appl. No. 12/282,981, Non-Final Office Action, mailed on Apr. 29, 2009, 12 pages.

U.S. Appl. No. 12/282,981, Final Office Action, mailed on Mar. 4, 2010, 13 pages.

U.S. Appl. No. 12/282,981, Notice of Allowance, mailed on Mar. 14, 2014, 9 pages.

U.S. Appl. No. 12/282,981, Supplemental Notice of Allowability, mailed on Apr. 23, 2014, 4 pages.

\* cited by examiner

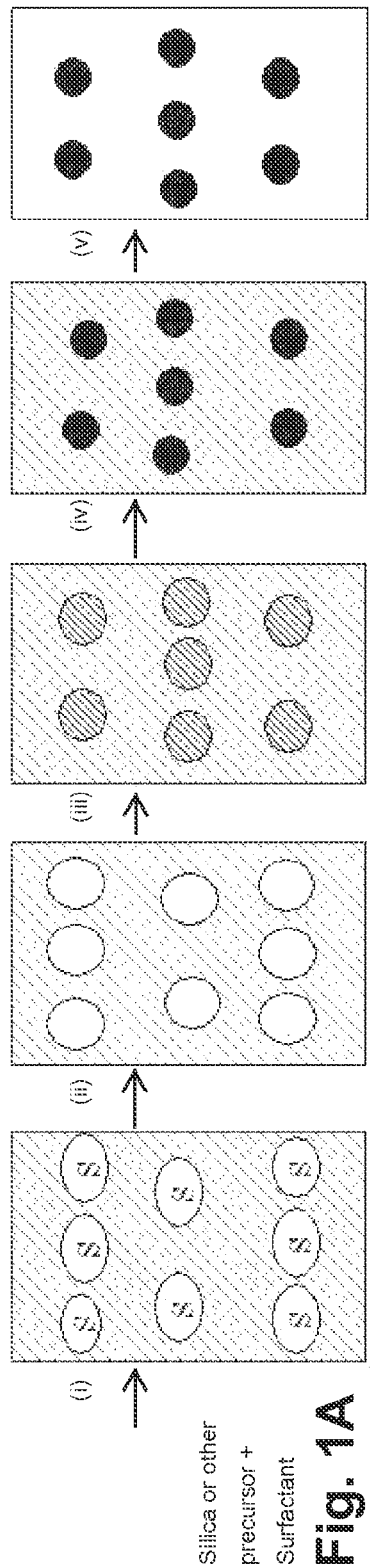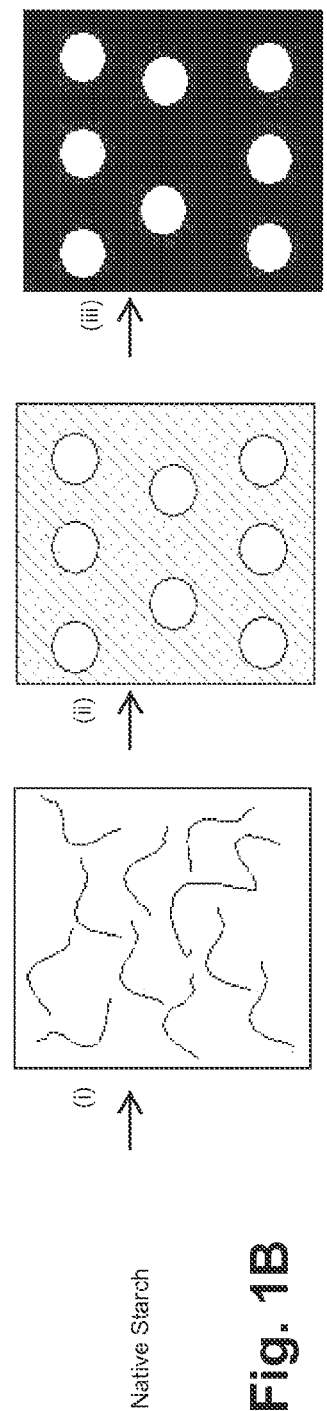
Fig. 1A
Fig. 1B

Fig. 11A
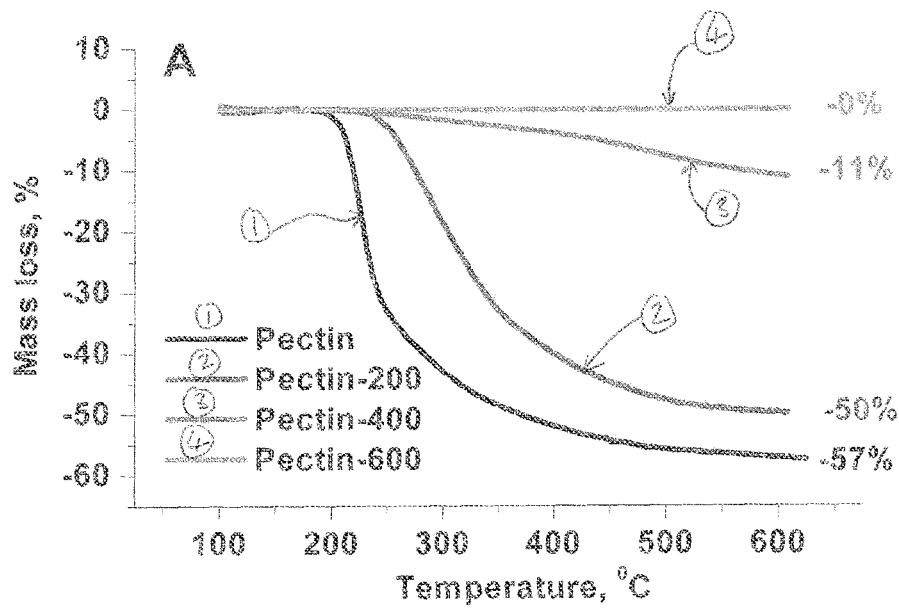
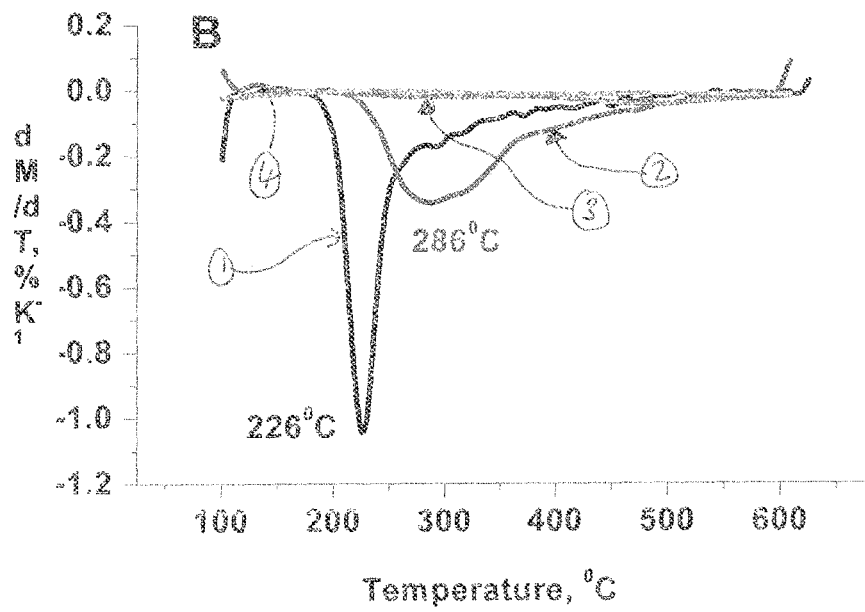
Fig. 11B

Fig. 17
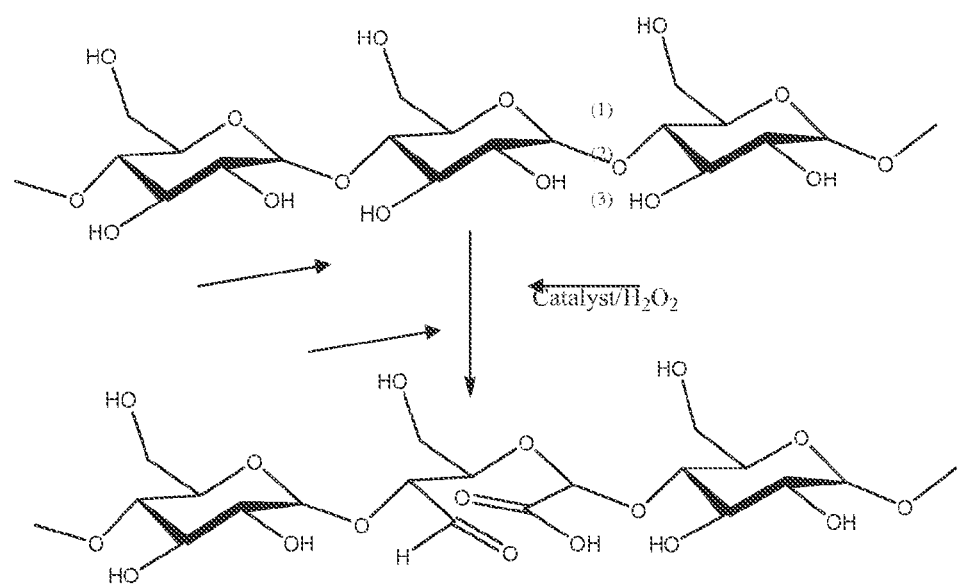
Fig. 18A
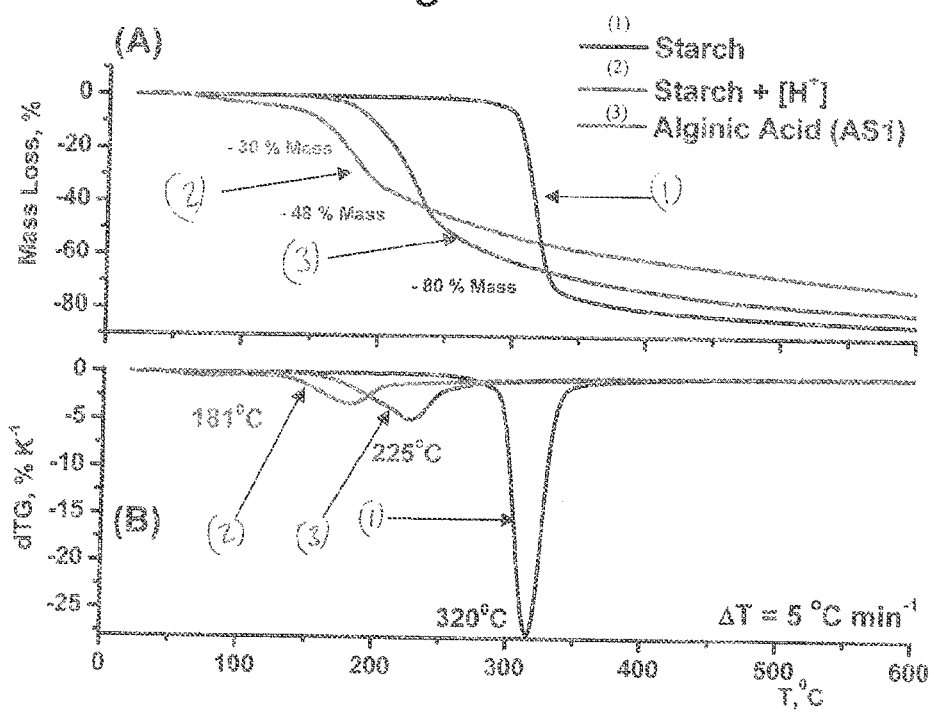
Fig. 18B

Fig. 19A Fig. 19B
Fig. 19C Fig. 19D
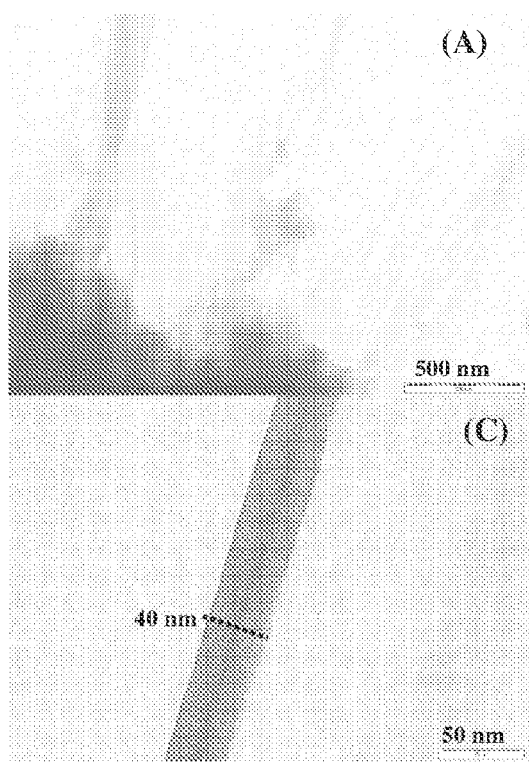
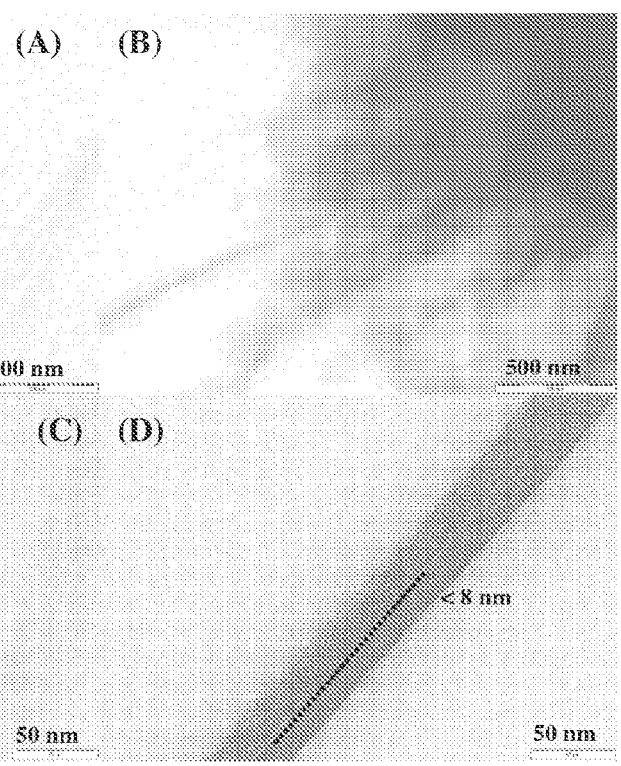

POLYSACCHARIDE DERIVED MATERIALS

The present disclosure relates to materials derived preferably from high surface area polysaccharides and which have mesoporous properties, that is, the materials have a physical structure which includes pores within the size range conventionally designated as mesoporous. Preferred materials are predominantly mesoporous, but the presence of pores of other sizes is not excluded. More especially, materials of the invention are derived from such high surface area polysaccharides by means of a thermal treatment. Thermal treatment modifies the chemical constitution of the polysaccharide and, depending on the particular thermal treatment regime, the polysaccharide may be modified by the thermal treatment to a greater or lesser extent. The thermal treatment may result in a carbonisation, or a partial carbonisation, of the polysaccharide. The present disclosure also relates to methods of preparation of such materials from various precursor polysaccharide materials and to the uses of such materials, including processes in which the materials can usefully be employed.

BACKGROUND

Almost 1 MT/y of activated carbons are used in a very wide variety of applications. The largest volume use of activated carbons is in water treatment with other important applications including gas purification, decolourisation and adsorbency. More speciality, small volume, uses include catalysis, electrochemistry including fuel cells, biomedical devices, hydrogen storage, personal protection and automotive components. Activated carbons are used in different physical forms including powders, beads, cloths and monoliths.

Most activated carbons are made from highly abundant, low cost and essentially sustainable raw materials including coconut, coal, lignite, wood and fruitstones. The problems and limitations with such carbons include high levels of impurities, variable pore structures and limited physical forms in which they can be made stable. In particular, it would be desirable to make activated carbon-type materials with high mesoporosity for liquid phase and biomedical applications, and to make such activated carbons which can be shaped into stable forms including monoliths for good control of pressure drop and good heat and mass transfer characteristics. Such materials can be used in more specialised applications and attract higher prices.

One known approach to the preparation of more mesoporous and shaped activated carbons is through the use of synthetic organic polymer precursors. However, these are not environmentally sustainable materials being largely derived from petroleum-sourced polymers.

Another approach, which is illustrated schematically in FIG. 1A, for the preparation of mesoporous carbons is through the use of mesoporous inorganic solid templates (steps (i) and (ii)). By adsorption of a source of carbon such as sucrose into the pores (step (iii)) followed by decomposition of the carbon source (step (iv)) and dissolution of the inorganic template (step (v)), a mesoporous carbon can be formed. However, the method is multi-step, energy-intensive, and wasteful.

Another approach to the preparation of mesoporous carbons is through metal carbide precursors, for example zirconium carbide. However, these approaches require the preparation of the precursors, can be expensive and only in some cases give a mesoporous structure.

Polysaccharides are non-toxic, naturally abundant and biodegradable and as such represent a vital renewable resource for sustainable development. Like all organic materials, they can be carbonised, typically by heating to high (>300° C.) temperatures in an inert atmosphere. The materials produced in this way from ordinary native (i.e. non-modified) cellulose and starches are normally of limited value due to high microporosity and because very little control is possible in the preparation over the bulk or surface structure. There is a need to develop new, simpler and less wasteful routes to mesoporous carbonaceous and a need to design new forms of carbonaceous materials, especially with controlled bulk and surface structures, functionalisation (such as acidity) or derivatisation (such as metal adsorption) and activity in aqueous environments.

The terms "mesoporous", "mesoporosity", "microporous" and "microporosity are used herein in accordance with IUPAC (International Union of Pure and Applied Chemistry) standards. Mesoporosity includes pore size distributions typically between 2 to 50 nm (20 to 500 Å) whereas materials with pore sizes typically smaller than 2 nm (20 Å) are considered as microporous.

In the context of the present invention, "carbonisation" is used to refer to a thermal treatment process in the nature of pyrolysis in which modification of the chemical structure of the material subject to the thermal treatment process occurs, such as by modification of, or loss of, functional groups. "Carbonisation" as used herein does not require that only carbon is left as a residue after the carbonisation process, although in some cases (e.g. higher temperatures) that may be so. In other words, "carbonisation" should be understood to include partial carbonisation. "Carbonised" should be construed accordingly.

The present invention relates to new mesoporous solids comprising polysaccharide derived porous materials, or derived from polysaccharide derived porous materials by thermal treatment of the polysaccharides. In preferred materials of the invention, the polysaccharide derived porous material has a mesoporous structure and the material after the thermal treatment retains at least some of (and preferably at least a significant proportion of, and desirably most of) that mesoporous structure. The present invention also relates to functionalised and derivatised variants thereof such materials, to methods of their production and to uses thereof.

According to a first aspect of the invention there is provided a mesoporous carbonised material obtained or obtainable by thermal treatment of an expanded polysaccharide possessing acidic functionality and, optionally, one or more further expanded polysaccharides.

Preferably the acidic functionality comprises an acidic functional group which is covalently attached to the expanded polysaccharide.

In preferred embodiments, the acidic functionality comprises a carboxyl or sulfate group.

Preferably said expanded polysaccharide or, where present, one or more of said further expanded polysaccharides has a chemical structure which permits sufficient movement about the glycosidic linkage of the polysaccharide to allow formation in a fluid environment of an at least partly self-assembled mesoporous physical structure of the polysaccharide material.

In preferred embodiments, the self-assembled physical structure is a helical structure.

Preferably said expanded polysaccharide possessing acidic functionality is selected from alginic acid, pectin, carageenan and polysaccharides chemically modified to include an acidic functional group.

In preferred embodiments said expanded polysaccharide possessing acidic functionality is alginic acid.

In other preferred embodiments said expanded polysaccharide possessing acidic functionality is pectin.

In still other preferred embodiments said expanded polysaccharide possessing acidic functionality is carageenan.

Preferably the mesoporous material comprises pores in the mesoporous and microporous size distribution ranges.

Preferably the ratio of the mesoporous volume ($V_{meso}$) to microporous volume ($V_{micro}$) is greater than 10, when calculated using the t-plot method.

In some preferred embodiments the ratio of $V_{meso}$ to $V_{micro}$ is greater than 10 and less than 500, when calculated using the t-plot method.

In other preferred embodiments the ratio of $V_{meso}$ to $V_{micro}$ is greater than 10 and less than 200, when calculated using the t-plot method.

In still other preferred embodiments the ratio of $V_{meso}$ to $V_{micro}$ is greater than 50 and less than 500, when calculated using the t-plot method.

In yet other preferred embodiments the ratio of $V_{meso}$ to $V_{micro}$ is greater than 50 and less than 200, when calculated using the t-plot method.

Preferably $V_{meso}$ is greater than 0.2 $cm^3 g^{-1}$.

In some preferred embodiments $V_{meso}$ is greater than 0.5 $cm^3 g^{-1}$.

In other preferred embodiments $V_{meso}$ is greater than 0.8 $cm^3 g^{-1}$.

In yet other preferred embodiments $V_{meso}$ is greater than 1 $cm^3 g^{-1}$.

In still other embodiments $V_{meso}$ is less than 3 $cm^3 g^{-1}$.

In particularly preferred embodiments $V_{meso}$ is less than 2 $cm^3 g^{-1}$.

In some preferred embodiments the mesoporous material is partially carbonised. In other preferred embodiments the mesoporous material is substantially carbonised (that is, carbonisation of the material is substantially complete). The degree or extent of carbonisation is selectable in accordance with the desired final properties of the material.

Preferably the thermal treatment comprises heating at a temperature in the range of from room temperature to about 1200° C.

In particularly preferred embodiments the thermal treatment comprises heating from room temperature to a temperature of not more than about 700° C.

In some preferred embodiments the thermal treatment comprises heating at a temperature in the range of from room temperature to about 600° C.

In other preferred embodiments the thermal treatment comprises heating at a temperature in the range of from room temperature to about 450° C.

In still other preferred embodiments the thermal treatment comprises heating at a temperature in the range of from room temperature to about 400° C.

In yet other preferred embodiments the thermal treatment comprises heating at a temperature in the range of from room temperature to about 320° C.

In still other preferred embodiments the thermal treatment comprises heating at a temperature in the range of from room temperature to about 250° C.

In yet other preferred embodiments the thermal treatment comprises heating at a temperature in the range of from room temperature to about 200° C.

In further preferred embodiments the thermal treatment comprises heating at a temperature in the range of from room temperature to about 180° C.

In the above embodiments preferably the thermal treatment comprises heating at a temperature of not less than 100° C., more especially not less than 170° C.

In preferred embodiments the thermal treatment is carried out in a non-oxidative atmosphere, such as in vacuum or in an inert atmosphere.

Preferably the thermal treatment includes alternate heating stages and isothermal stages.

In some preferred embodiments the isothermal stages have a duration of from about 10 to about 50 minutes.

In other preferred embodiments the isothermal stages have a duration of from about 20 to about 40 minutes.

In further preferred embodiments the isothermal stages have duration of about 30 minutes.

In some preferred embodiments, in the heating stages, the rate of heating is from about 0.5K/minute to about 20K/minute.

In further preferred embodiments the rate of heating is from about 1K/minute to about 10K/minute.

According to a second aspect of the invention there is provided a method of preparing a mesoporous carbonised material comprising thermal treatment of an expanded polysaccharide, wherein the polysaccharide possesses acidic functionality and, optionally, comprises one or more further expanded polysaccharides.

Preferably the acidic functionality comprises an acidic functional group which is covalently attached to the expanded polysaccharide.

In preferred embodiments, the acidic functionality comprises a carboxyl or sulfate group.

Preferably said expanded polysaccharide or, where present, one or more of said further expanded polysaccharides has a chemical structure which permits sufficient movement about the glycosidic linkage of the polysaccharide to allow formation in a fluid environment of an at least partly self-assembled mesoporous physical structure of the polysaccharide material.

In preferred embodiments, the self-assembled physical structure is a helical structure.

Preferably said expanded polysaccharide possessing acidic functionality is selected from alginic acid, pectin, carageenan and polysaccharides chemically modified to include an acidic functional group.

In preferred embodiments said expanded polysaccharide possessing acidic functionality is alginic acid.

In other preferred embodiments said expanded polysaccharide possessing acidic functionality is pectin.

In still further preferred embodiments said expanded polysaccharide possessing acidic functionality is carageenan.

Preferably the material comprises pores in the mesoporous and microporous size distribution ranges.

Preferably the ratio of the mesoporous volume ($V_{meso}$) to microporous volume ($V_{micro}$) of the material obtained according to the method of this aspect is greater than 10, when calculated using the t-plot method.

In other preferred embodiments of the material obtained according to the method of this aspect the ratio of $V_{meso}$ to $V_{micro}$ is greater than 10 and less than 500, when calculated using the t-plot method.

In further preferred embodiments of the material obtained according to the method of this aspect the ratio of $V_{meso}$ to $V_{micro}$ micro is greater than 10 and less than 200, when calculated using the t-plot method.

In still other preferred embodiments of the material obtained according to the method of this aspect the ratio of $V_{meso}$ to $V_{micro}$ is greater than 50 and less than 500, when calculated using the t-plot method.

In yet other preferred embodiments of the material obtained according to the method of this aspect the ratio of $V_{meso}$ to $V_{micro}$ is greater than 50 and less than 200, when calculated using the t-plot method.

Preferably $V_{meso}$ of the material obtained according to the method of this aspect is greater than 0.2 cm$^3$g$^{-1}$.

In further preferred embodiments the material obtained according to the method of this aspect has a $V_{meso}$ of greater than 0.5 cm$^3$g$^{-1}$.

In other preferred embodiments the material obtained according to the method of this aspect has a $V_{meso}$ of greater than 0.8 cm$^3$g$^{-1}$.

In still other preferred embodiments the material obtained according to the method of this aspect has a $V_{meso}$ of greater than 1 cm$^3$g$^{-1}$.

In yet other embodiments the material obtained according to the method of this aspect has a $V_{meso}$ of less than 3 cm$^3$g$^{-1}$.

In preferred embodiments the material obtained according to the method of this aspect has a $V_{meso}$ of less than 2 cm$^3$g$^{-1}$.

Preferably the thermal treatment is such that the material obtained according to the method of this aspect is partially carbonised. Alternatively, the thermal treatment may preferably be such that the material is substantially carbonised.

Preferably the thermal treatment comprises heating at a temperature in the range of from room temperature to about 1200° C.

In some preferred embodiments the thermal treatment comprises heating from room temperature to a temperature of not more than about 700° C.

In other preferred embodiments the thermal treatment comprises heating at a temperature in the range of from room temperature to about 600° C.

In further preferred embodiments the thermal treatment comprises heating at a temperature in the range of from room temperature to about 450° C.

In yet other preferred embodiments the thermal treatment comprises heating at a temperature in the range of from room temperature to about 400° C.

In still other preferred embodiments the thermal treatment comprises heating at a temperature in the range of from room temperature to about 320° C.

In yet further preferred embodiments the thermal treatment comprises heating at a temperature in the range of from room temperature to about 250° C.

In still further preferred embodiments the thermal treatment comprises heating at a temperature in the range of from room temperature to about 200° C.

In yet other preferred embodiments the thermal treatment comprises heating at a temperature in the range of from room temperature to about 180° C.

Preferably in these embodiments the thermal treatment comprises heating at a temperature of not less than 100° C., more especially not less than 170° C.

In particularly preferred embodiments the thermal treatment is carried out in a non-oxidative atmosphere, such as in vacuum or in an inert atmosphere.

Preferably the thermal treatment includes alternate heating stages and isothermal stages.

In some preferred embodiments the isothermal stages have a duration of from about 10 to about 50 minutes.

In other preferred embodiments the isothermal stages have a duration of from about 20 to about 40 minutes.

In further preferred embodiments the isothermal stages have duration of about 30 minutes.

In some preferred embodiments, in the heating stages, the rate of heating is from about 0.5K/minute to about 20K/minute.

In further preferred embodiments the rate of heating is from about 1K/minute to about 10K/minute.

It will be appreciated that the mesoporous materials of the first aspect of the invention can be produced using the methods of the second aspect of the invention.

According to a third aspect of the invention there is provided the use of a mesoporous material according to the first aspect of the invention as a stationary phase for chromatography, as a water treatment agent, as an agent for gas purification, decolourisation or adsorbency, as a catalyst or catalytic support, as an electrode component in electrochemistry, as a hydrogen storage medium, as a filter medium, or as a component of a biomedical device.

Preferably the mesoporous material is used as a stationary phase for chromatography.

Preferably the mesoporous material is used as a water treatment agent.

Preferably the mesoporous material is used as an agent for gas purification.

Preferably the mesoporous material is used as an agent for gas decolourisation.

Preferably the mesoporous material is used as an agent for gas adsorbency.

Preferably the mesoporous material is used as a catalyst.

Preferably the mesoporous material is used as a catalytic support.

Preferably the mesoporous material is used as an electrode component in electrochemistry.

Preferably the mesoporous material is used as a hydrogen storage medium.

Preferably the mesoporous material is used as a filter medium.

Preferably the mesoporous material is used as a component of a biomedical device.

A further aspect of the invention provides a chromatography apparatus comprising a material according to the first aspect of the invention as a stationary phase.

For a better understanding of the invention and to show how the same may be carried into effect, reference will be made, by way of example only, to the following Figures, in which:

FIG. 1A shows a prior art synthesis route;

FIG. 1B illustrates schematically a synthesis route according to the present disclosure;

Figure 4:
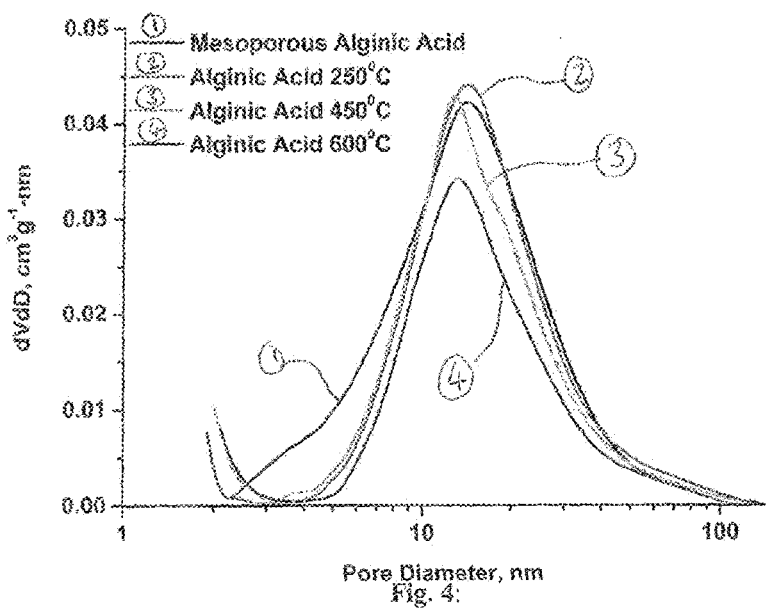
Figure 5:
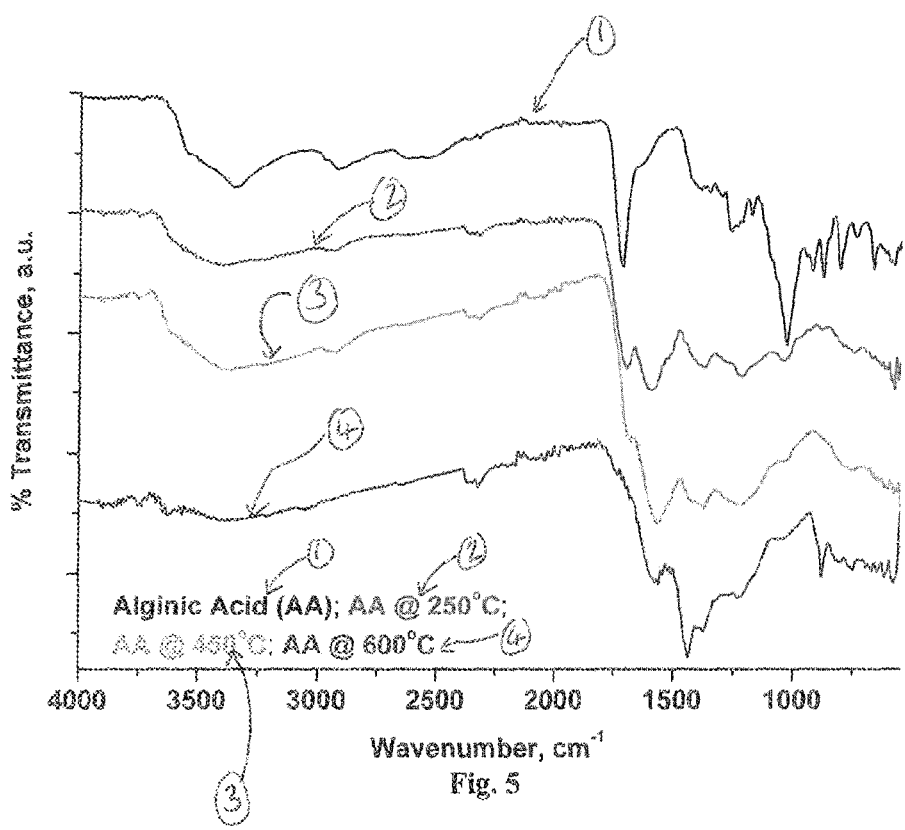
Figure 6A:
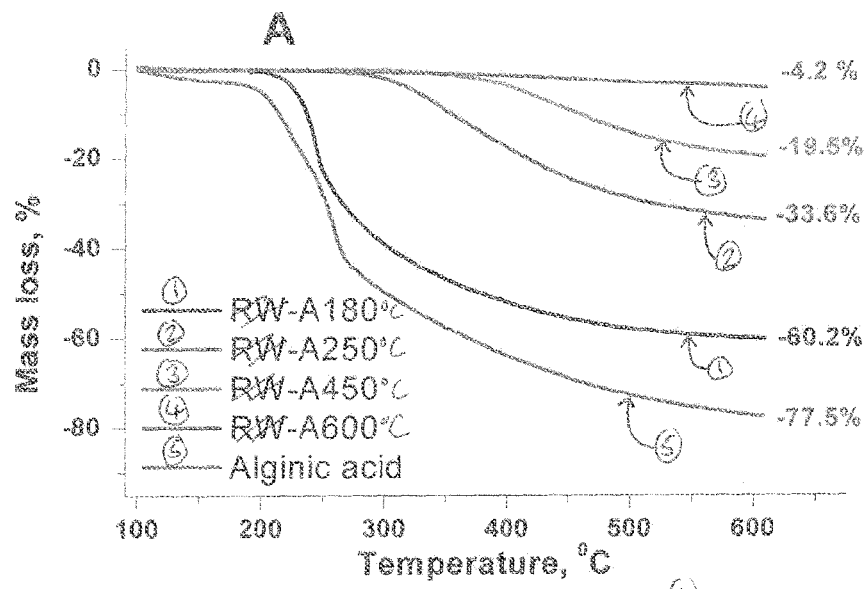
Figure 6B:
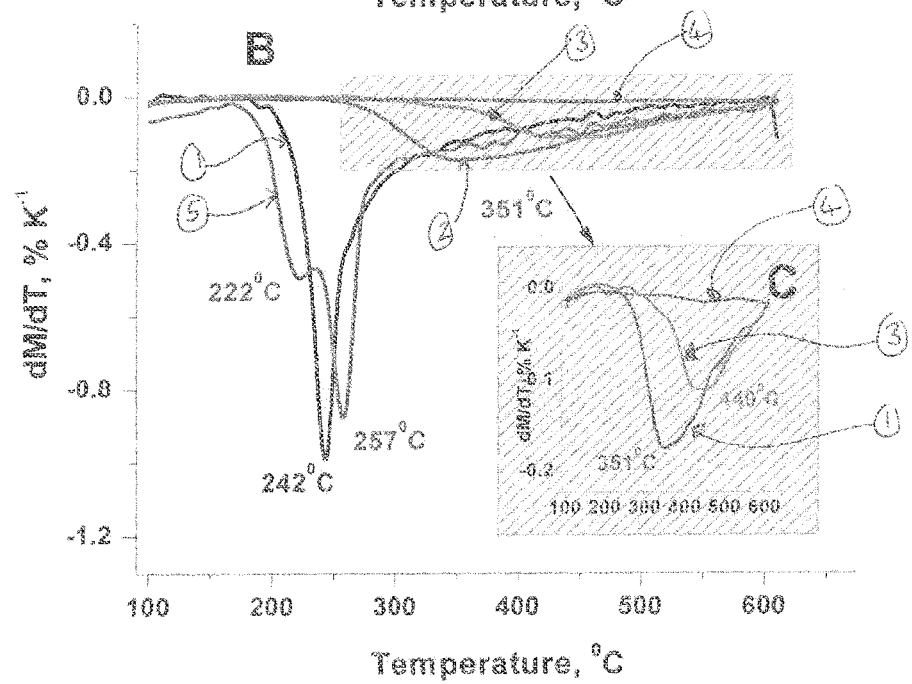
Figure 7:
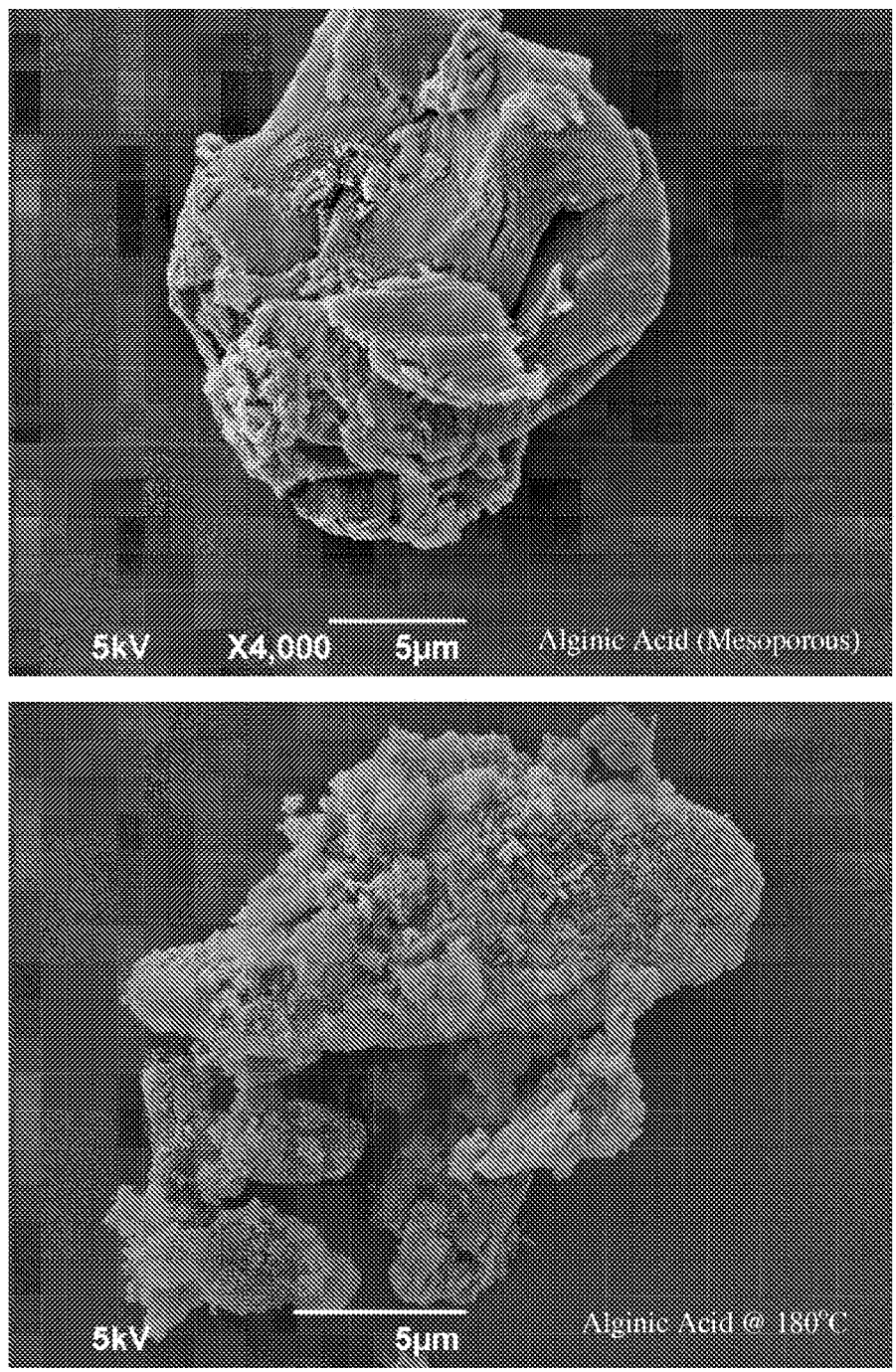
Figure 7:
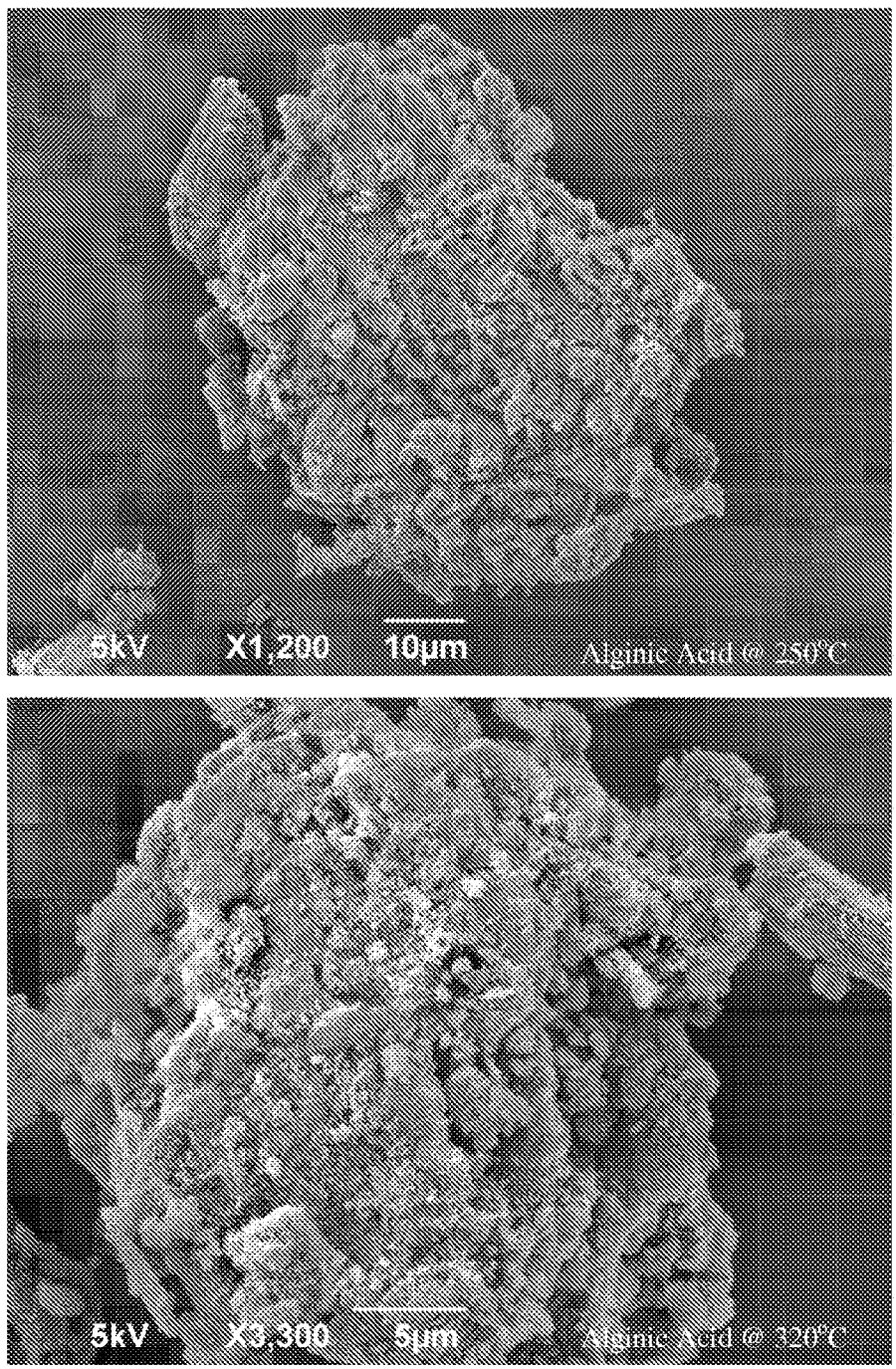
Figure 7:
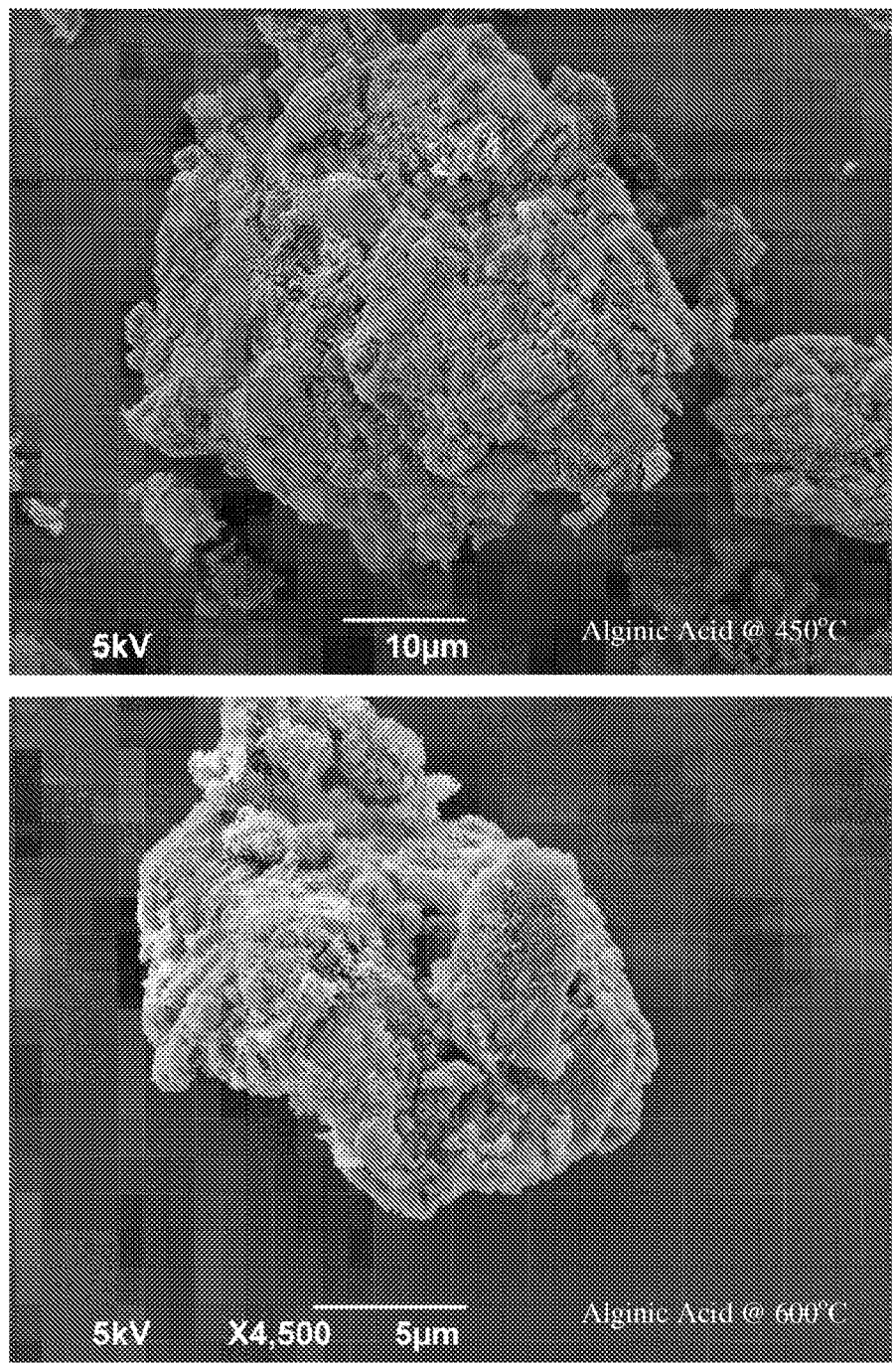
Figure 8:
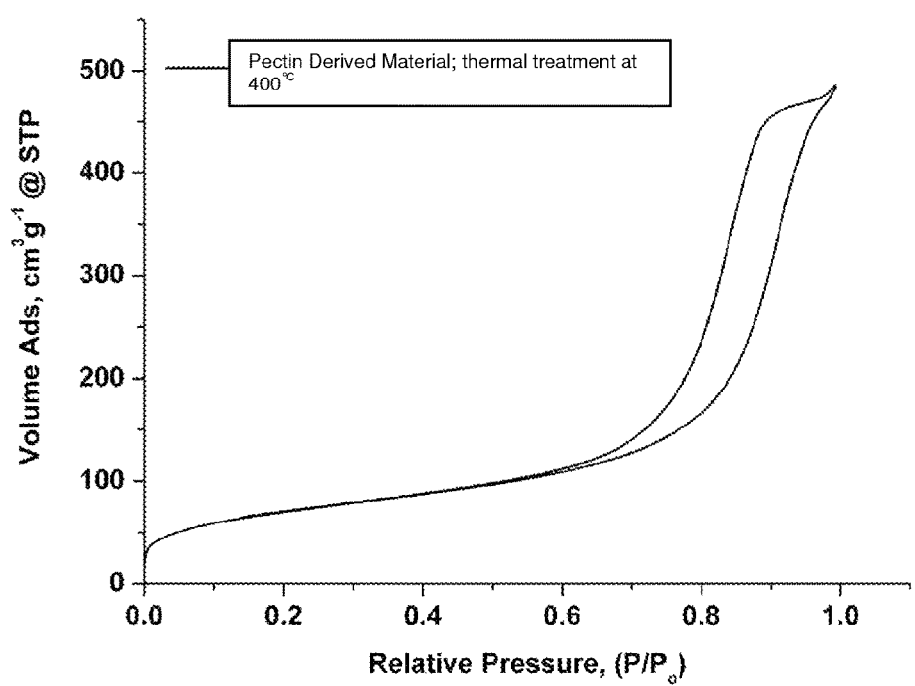
Figure 9:
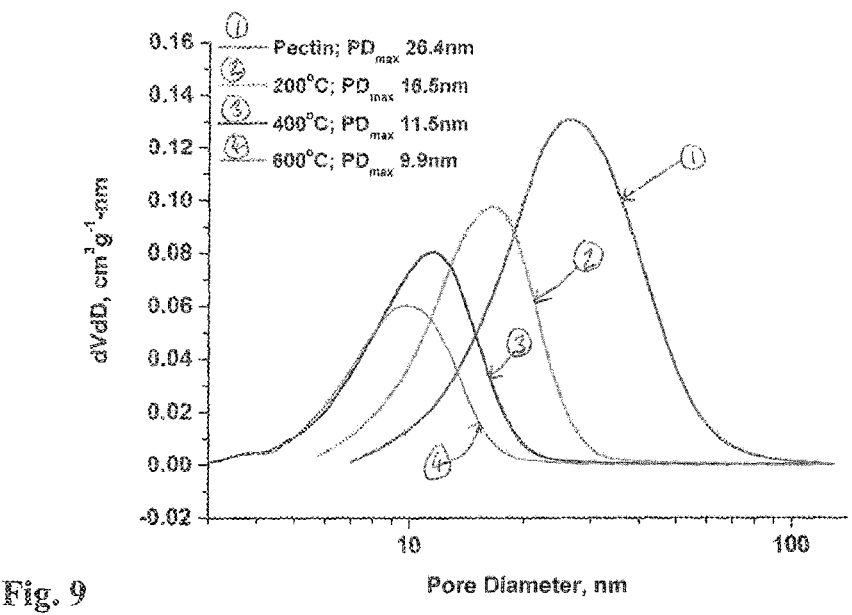
Figure 10:
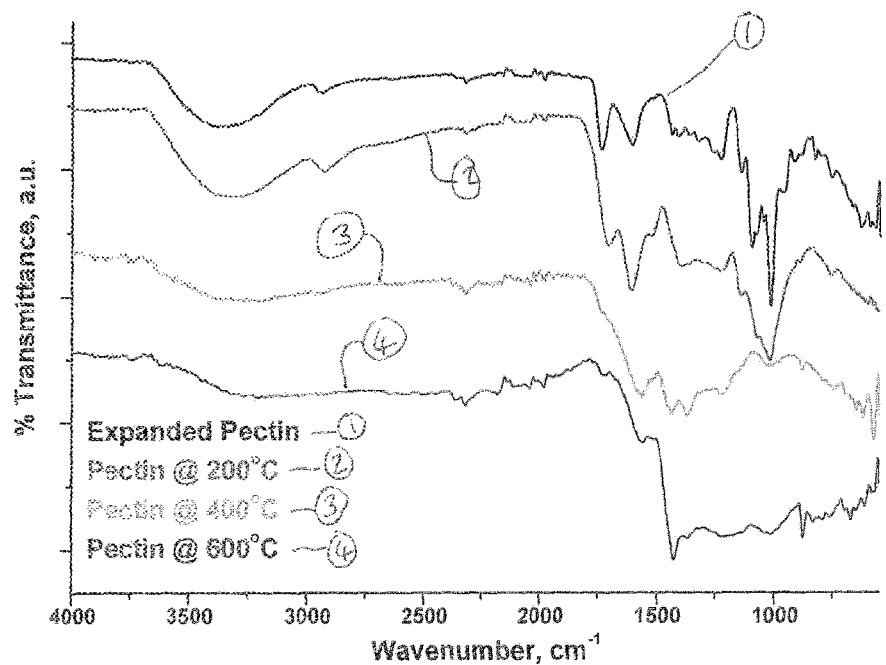
Figure 12:
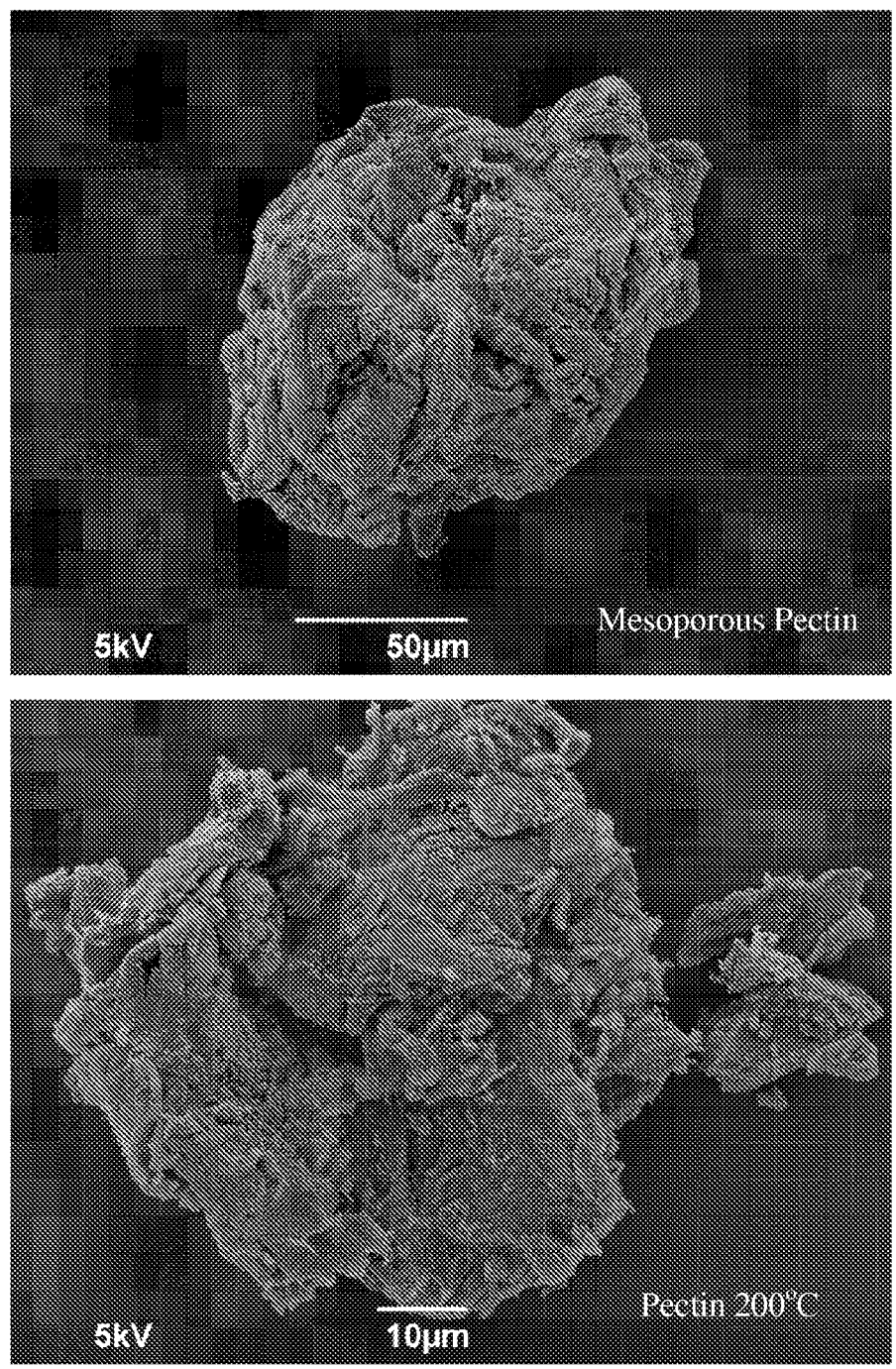
Figure 12:
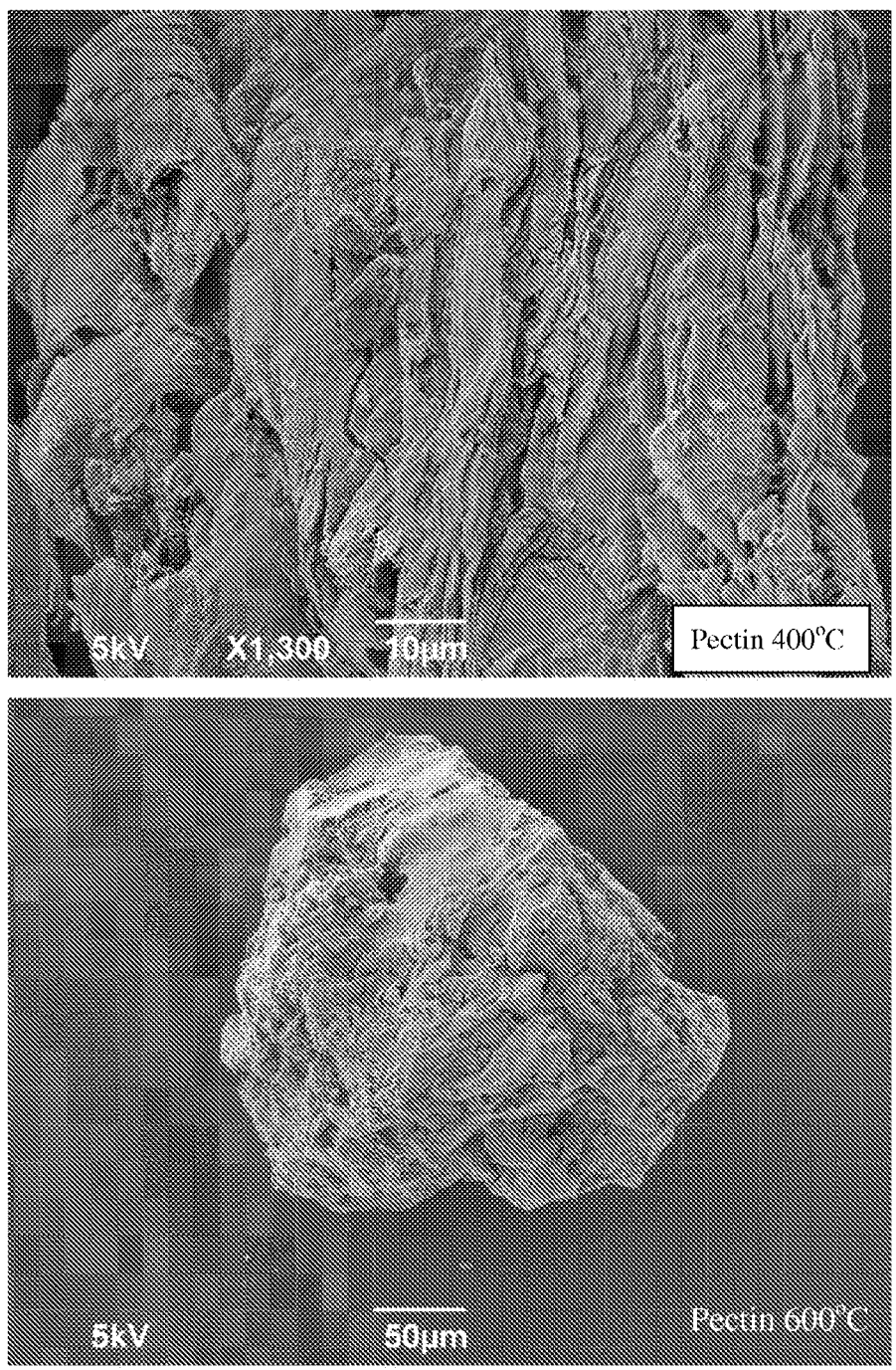
Figure 13:
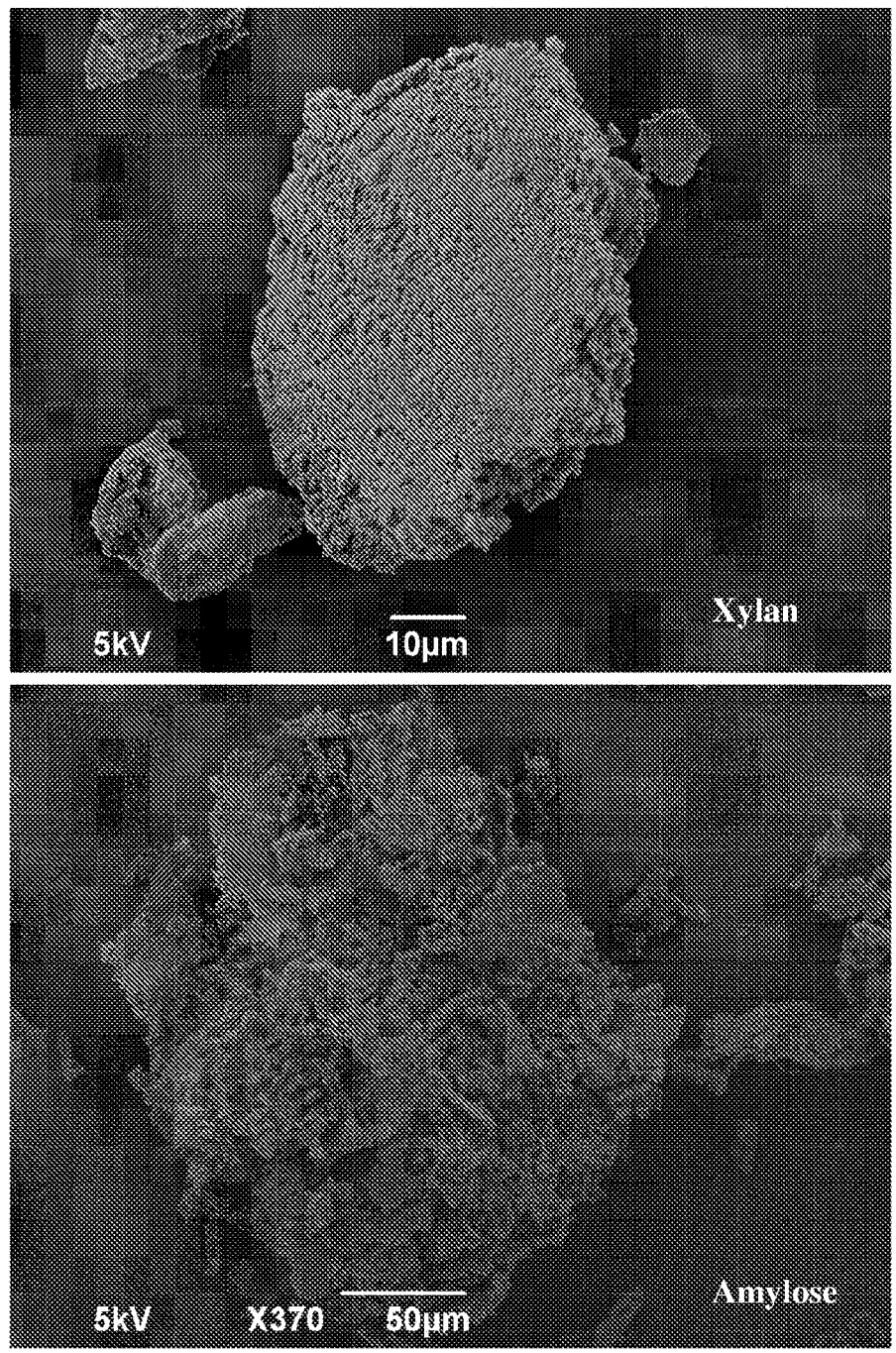
Figure 14:
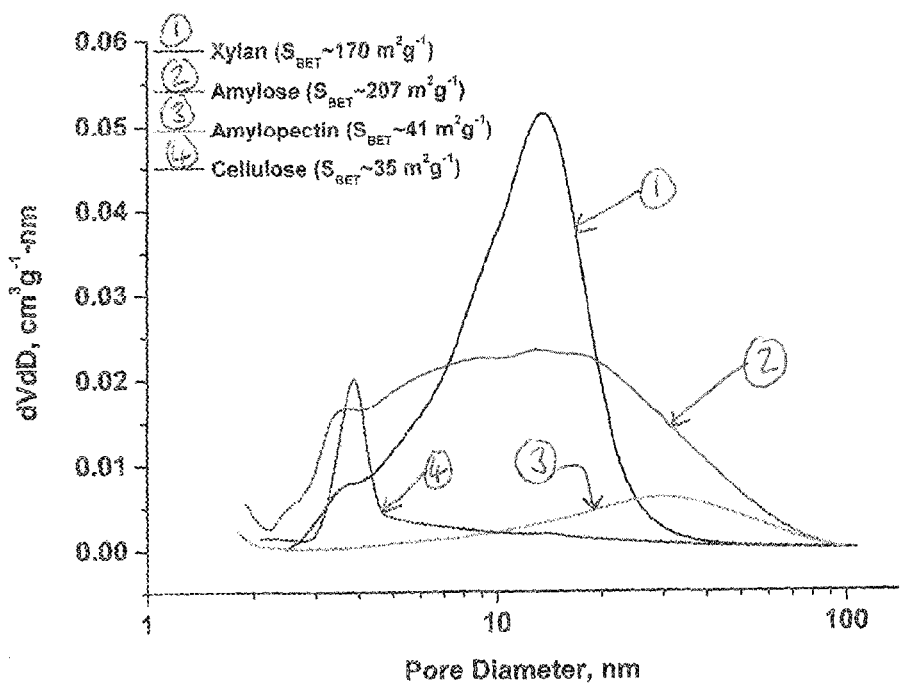
Figure 15:
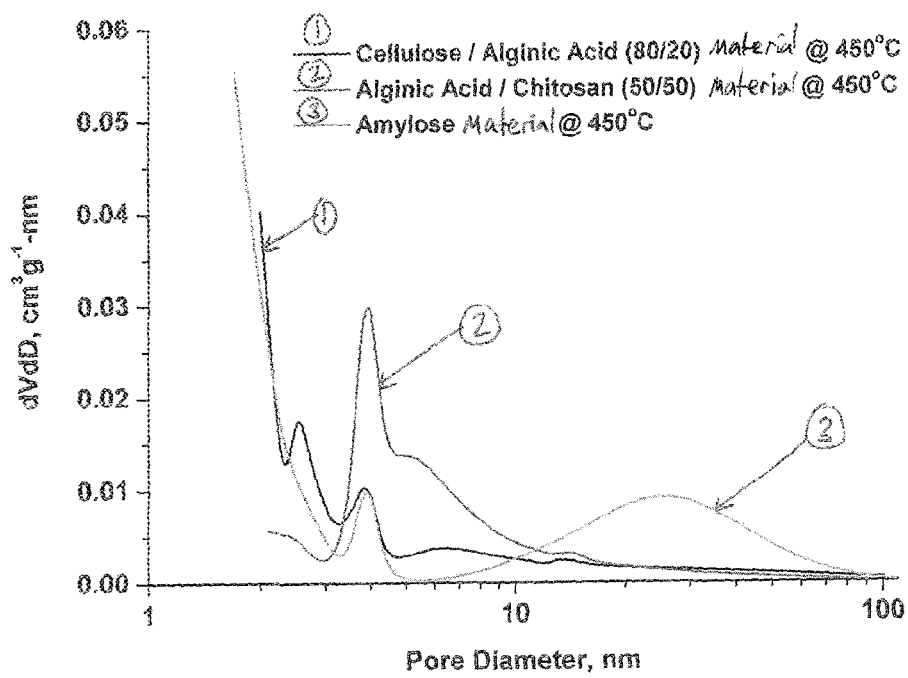
Figure 16A:
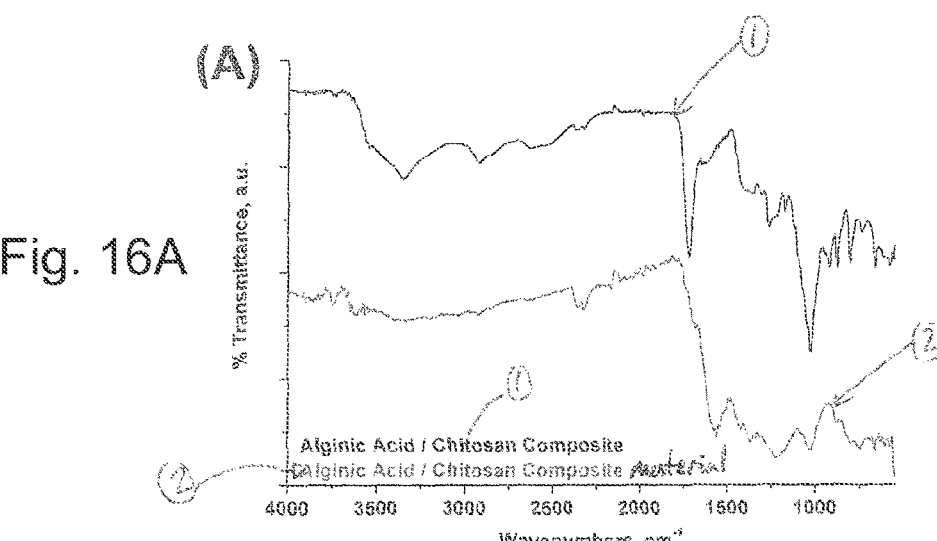
Figure 16B:
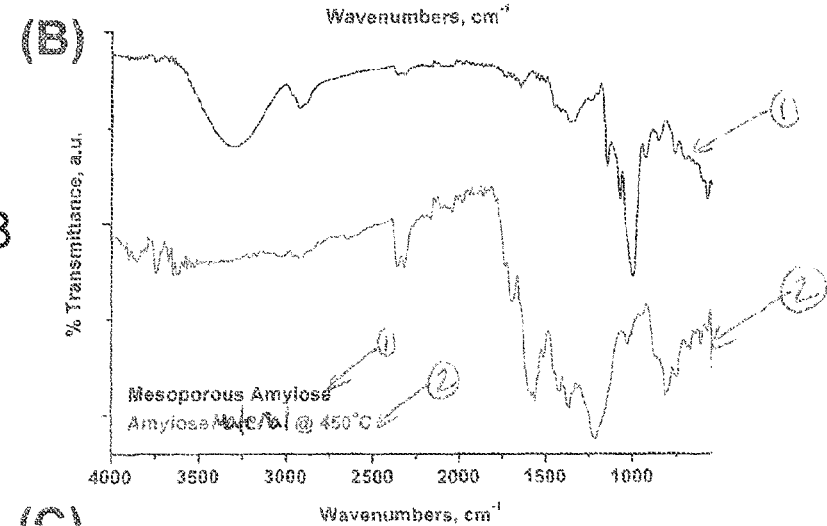
Figure 16C:
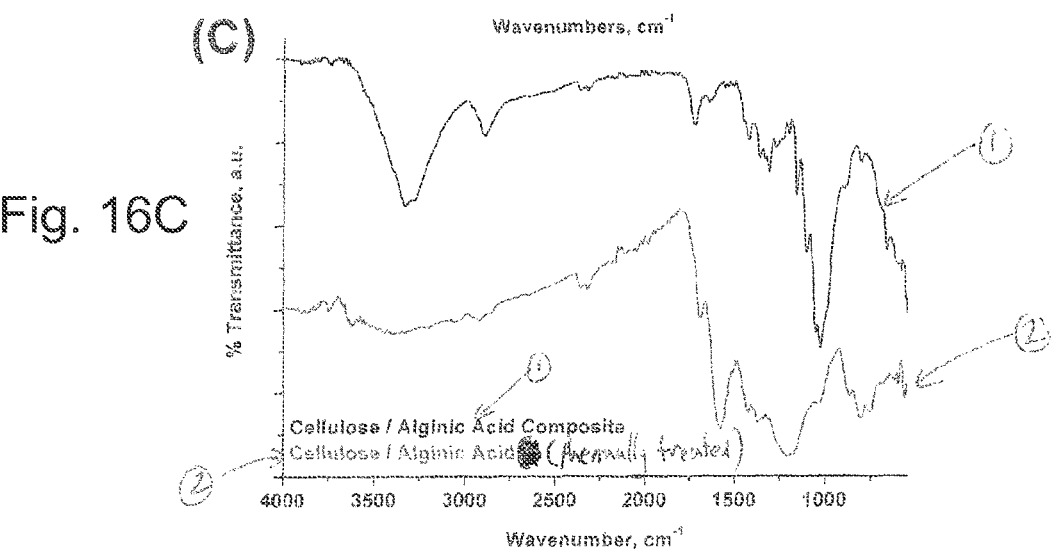
Figure 20A:
Figure 20B:
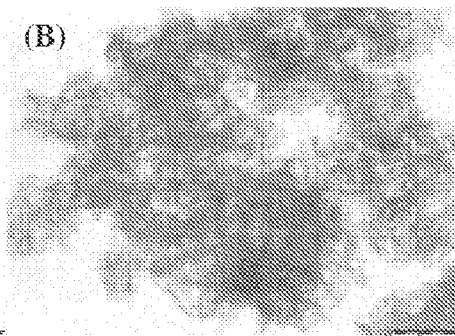
Figure 20C:
Figure 20D:
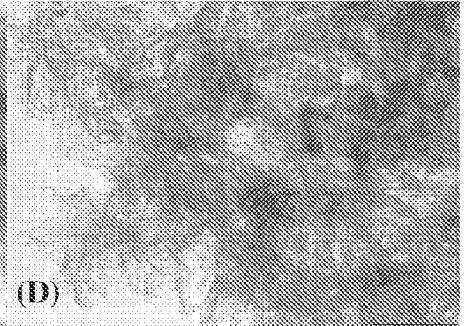
Figure 21A:
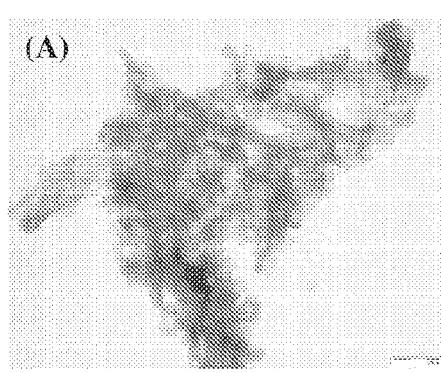
Figure 21B:
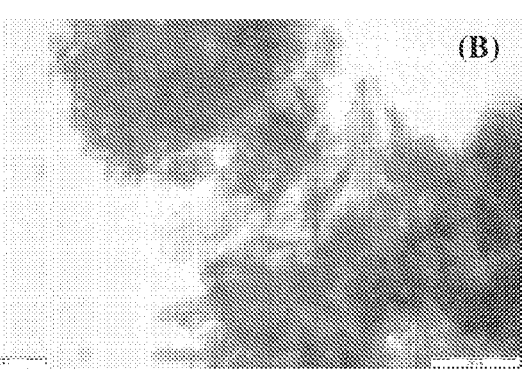
Figure 22A:
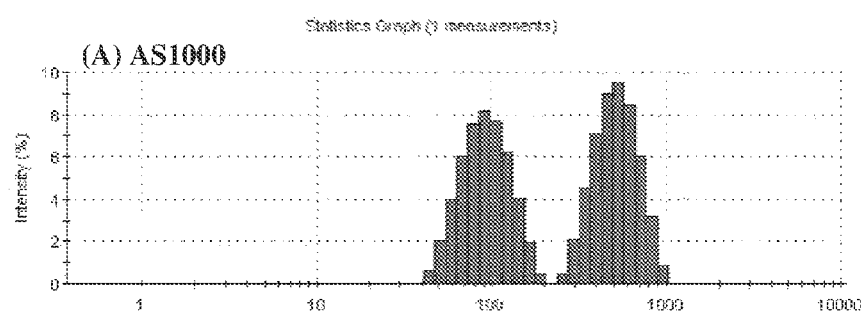
Figure 22B:
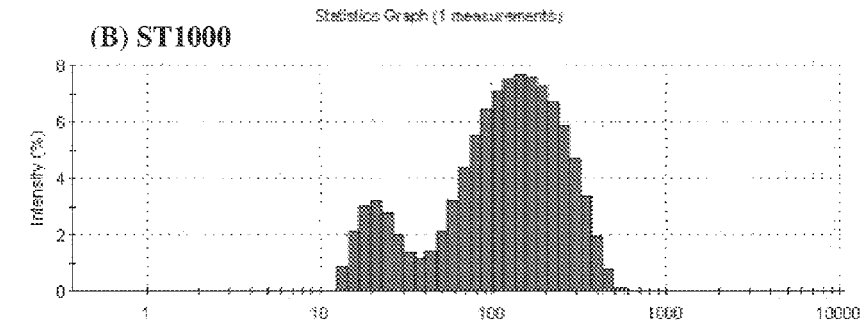
Figure 22C:
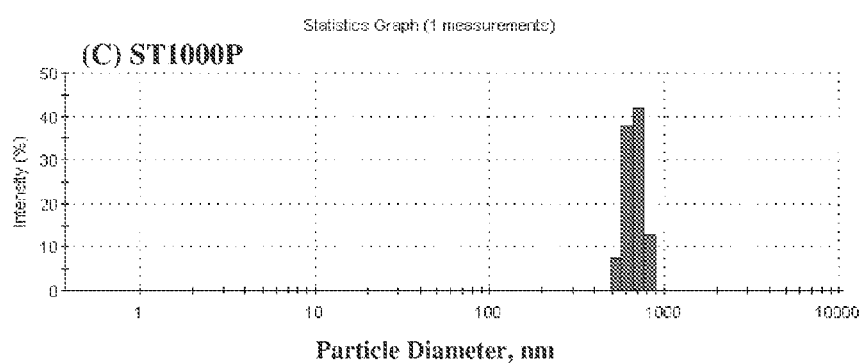

FIG. 4 indicates the pore size distribution of mesoporous alginic acid and of mesoporous materials prepared from alginic acid in accordance with the invention, calculated using the BJH model and the nitrogen desorption profile;

FIG. 5 presents FT-IR spectra of alginic acid and alginic acid derived mesoporous materials;

FIG. 6A plots the results of thermogravimetric analysis of mesoporous alginic acid and alginic acid derived mesoporous materials;

FIG. 6B plots the results of thermogravimetric analysis of mesoporous alginic acid and alginic acid derived mesoporous materials;

FIG. 7 shows scanning electron microscope images of alginic acid and mesoporous materials prepared from alginic acid in accordance with the invention;

FIG. 8 shows a nitrogen adsorption/desorption isotherm for a sample of a mesoporous material prepared from pectin in accordance with the invention using a thermal treatment regime with a maximum temperature of 400° C.;

FIG. 9 indicates the pore size distribution of mesoporous pectin and mesoporous material prepared from pectin in accordance with the invention, calculated using the BJH Model and the nitrogen desorption profile;

FIG. 10 presents FT-IR spectra of mesoporous pectin and mesoporous material prepared from pectin in accordance with the invention;

FIG. 11A plots the results of thermogravimetric analysis of mesoporous pectin and mesoporous material prepared from pectin in accordance with the invention;

FIG. 11B plots the results of thermogravimetric analysis of mesoporous pectin and mesoporous material prepared from pectin in accordance with the invention;

FIG. 12 shows scanning electron microscope images of mesoporous pectin and mesoporous material prepared from pectin in accordance with the invention;

FIG. 13 shows scanning electron microscope images of mesoporous xylan and amylose;

FIG. 14 indicates the pore size distribution of cellulose, amylose, amylopectin and xylan, calculated using the BJH Model and the nitrogen desorption profile;

FIG. 15 indicates the pore size distribution of materials derived according to the method employed in the present invention from mesoporous amylose and the composites of alginic acid/chitosan (50/50) and cellulose/alginic acid (80/20), calculated using the BJH Model and the nitrogen desorption profile;

FIG. 16A presents FT-IR spectra of mesoporous amylose & mesoporous material prepared from amylose in accordance with the invention using a thermal treatment regime with a maximum temperature of 450° C.;

FIG. 16B presents FT-IR spectra of mesoporous material prepared from an alginic acid/chitosan composite (50/50) in accordance with the invention using a thermal treatment regime with a maximum temperature of 450° C.;

FIG. 16C presents FT-IR spectra of mesoporous material prepared from a cellulose/alginic acid composite (80/20) in accordance with the invention using a thermal treatment regime with a maximum temperature of 450° C.;

FIG. 17 summarises one useful method for the oxidation of polysaccharides to introduce carboxylic acid functionality;

FIG. 18(A) shows thermogravimetric profiles for starch, starch in the presence of p-toluene sulfonic acid and alginic acid, respectively;

FIG. 18(B) shows differential thermal analysis profiles for the materials in FIG. 18(A);

FIGS. 19A to 19D show transmission electron micrographs of expanded alginic acid derived materials prepared at 200° C. (AS200);

FIGS. 20(A) to 20(D) show transmission electron micrographs of (ScCO2 Dried) expanded alginic acid derived thermally treated materials prepared at (A) 300° C. (Magnification 87,000), (B) 500° C. (Magnification 26,500), (C) 500° C. (Magnification 160,000) and (D) 1000° C. (Magnification 87,000). [Scale Bar=200 nm (FIGS. 20A & 20D)), 500 nm (FIG. 20B), and 100 nm (FIG. 20C];

FIGS. 21(A) and 21(B) show TEM images of thermally dried expanded alginic acid derived thermally treated materials (A1). Tp=400° C. (FIG. 21(A)), and 600° C. (FIG. 21(B)). Both Images were acquired at a magnification of 87,000. [Scale Bar=200 nm]; and FIG. 22 shows Particle Size Analysis of (A) Alginic Acid Derived thermally treated material at 1000° C. (FIG. 22(A)); (B) Conventional Starch Derived thermally treated material at 1000° C. (FIG. 22(B)); and (C) Starch Derived thermally treated material utilising regular sized mesoporous starch particles as precursor (FIG. 22(C)) (see Chapter 3).

Figure 23:
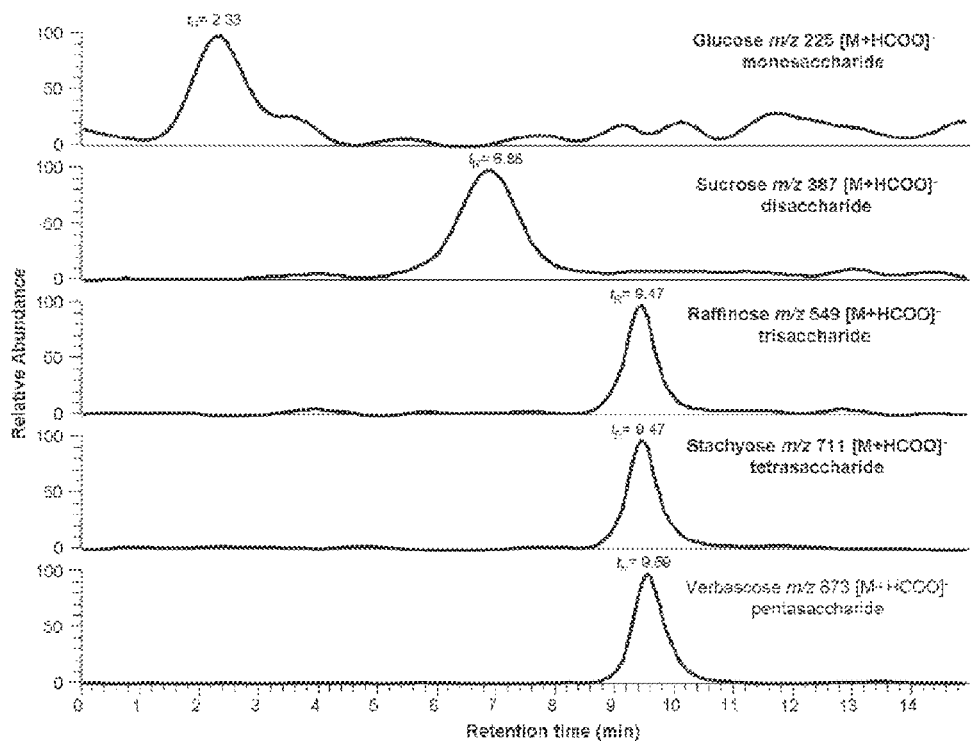

FIG. 23 shows extracted ion chromatograms obtained on the AS1000-LC-ESI-QIT-MS separation of 50 μM standard solution of a mixture of glucose, sucrose, raffinose, stachyose and verbascose. HPLC conditions: AS1000 column (50 mm×4.6 mm i.d.), 400 μL/min, 5 μL injection, gradient mobile phase of acetonitrile/0.1% aqueous formic acid.

Figure 24:
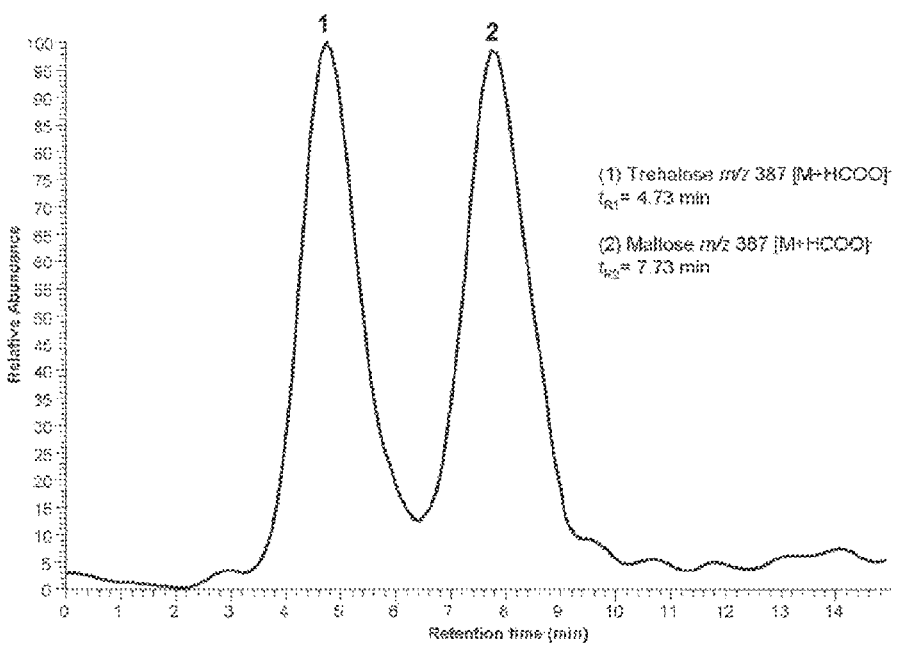

FIG. 24 shows extracted ion chromatograms obtained on the AS1000-LC-ESI-QIT-MS separation of 50 μg/mL standard solution of a mixture of the disaccharide isomers, trehalose and maltose. HPLC conditions: AS1000 column (50 mm×4.6 mm i.d.), 600 μL/min, 5 μL injection, mobile phase gradient composed of 50:50 acetonitrile/10% aqueous formic acid.

In preferred forms, the thermally treated mesoporous materials are produced from high surface area forms of polysaccharide derived porous materials and are typically characterised by having high degrees of mesoporosity. The thermally treated mesoporous materials have surface structures which, to varying degrees, resemble those of the "parent" polysaccharide derived porous material or are more carbon-like, the relative proportion being determined by, for example, the treatment temperature (100-700° C. or more). Higher treatment temperatures will normally lead to more carbon-like structures and lower treatment temperatures will result in more retained physical and chemical structural elements of the parent polysaccharide derived porous materials. This relative proportion is usable to influence subsequent functionalisation or derivatisation of the mesoporous materials and subsequent use in different applications.

One useful functionalisation is the preparation of solid acids. To convert the thermally treated mesoporous materials of the invention to solid acids (which are useful in, for example, catalysis), the thermally treated mesoprous materials can be reacted with sulfuric acid so as to form sulfuric acid functions on the surface of the material. Alternatively, to prepare carboxylic acid functionalised mesoporous materials, a cyano group containing moiety may be grafted to the thermally treated mesoporous material and subsequently hydrolysed to give the carboxylic acid. Such solid acids can be produced in different forms such as powders and pellets, thus extending the range of applications. These materials are stable to water (including hot water); they can be used as catalysts in aqueous media, such uses including the catalysis of reactions of compounds dissolved in water. The solid acid materials are useful catalysts for the reactions of compounds in aqueous solutions obtained from the fermentation of biomass.

Suitable methods for preparing "expanded" or high surface area starches are described, for example, in WO2005/011836 and U.S. Pat. No. 5,958,589 the disclosures of which are hereby incorporated by reference. The inventors have appreciated that these described methods are, in general terms, applicable also to the preparation of high surface area polysaccharides. Polysaccharides treated by these methods are referred to herein as "polysaccharide derived porous material" or "expanded polysaccharide". In general terms, suitable methods involve the steps of (i) thermally assisted hydration of a polysaccharide to yield a polysaccharide/water gel or colloidal suspension, (ii) allowing the polysaccharide to recrystallize and (iii) exchanging the water in the recrystallised polysaccharide with a water miscible non-solvent for the polysaccharide which has a lower surface tension than water. A suitable non-solvent is ethanol. The method can involve a series of solvents to remove the water and can involve final drying of the high surface area polysaccharide by evaporation, or can involve the use of supercritical drying including the use of liquid or supercritical carbon dioxide. The high surface area polysaccharide derived porous material can be stored as a solid material or kept as slurry in a non-solvent.

Functionalisation of the expanded polysaccharide may also, in some cases, usefully be performed, that is, prior to any thermal treatment step for carbonisation. In one particularly significant method, oxidation of the polysaccharide may be effected to introduce carboxylic acid groups. A particularly suitable method of oxidation uses $H_2O_2$ in the presence of an iron phthalocyanine catalyst. The method is generally as describe by Kachkarova-Sorokina et al in *Chem Commun*, 2004 2844-2845. and is summarised in FIG. 17.

An important feature of the present disclosure lies in the selection of polysaccharide materials which have mesoporous structure following the expansion process outlined above. In this way, the mesoporous structure can be retained, to a greater or lesser extent, in the materials of the invention following the thermal treatment. Without wishing to be bound by theory, the inventors believe that suitable polysaccharide materials are those which can adopt a substantially ordered structure following the thermal hydration/recrystallization process. In this process self organisation of the polysaccharides provides the desired mesoporosity. In particular, the inventors believe that polysaccharides which adopt a generally helical structure have the desired mesoporous structure. The inventors further believe that only those polysaccharides which, because of their chemical structure, permit sufficient movement about the glycosidic linkage of the polysaccharide are able to adopt the ordered structures providing the desired mesoporosity. In other words, those polysaccharides which, because of their chemical structure, have insufficient movement about the glycosidic linkage do not adopt the required ordered structure.

For example, the chemical structure of the polysaccharide may be such that movement about the glycosidic linkage is sterically limited, or there may be interactions between functional groups, such as hydrogen bonding, which limit movement about the glycosidic linkage.

The high surface area polysaccharide derived porous material can be converted directly into a carbonised mesoporous or thermally modified material of the invention by heating in suitable conditions. The heating may, in principle, be carried out at any temperature or other conditions at which suitable modification of the expanded polysaccharide, in particular partial carbonisation, substantially complete carbonisation or complete carbonisation occurs. Suitable conditions are preferably non-oxidative and desirably include vacuum conditions, or an inert atmosphere such as a nitrogen atmosphere. Conveniently, in some embodiments the heating conditions may include the use of microwave heating. In prior art methods conditions have also involved use of a catalyst (such an acid catalyst) which promotes the desired thermal modification (carbonisation). The amount of acid catalyst and its identity was varied in order to vary the subsequent processing and material properties.

Where an acid catalyst was used, one suitable method for preparing the mesoporous materials was to stir the expanded polysaccharide (prepared as described above) with 5% by weight of p-tolulene sulfonic acid in acetone, then to remove the acetone by evaporation.

In the invention, the expanded polysaccharide already contains acid functional groups (e.g. where the polysaccharide is expanded pectin or alginic acid). Thus, there may be no requirement to add an acid catalyst. In such cases, the acid-containing expanded polysaccharide is heated to about 100° C. or higher in either a vacuum or an inert atmosphere, in the absence of an acid catalyst and the desired thermally modified (carbonised) material is achieved.

The "self-carbonising" behaviour of expanded polysaccharides with innate acid functionally (.e.g. expanded alginic acid and pectin) is advantageous not only with regard to decreasing the number of process steps, but selection of such polysaccharides facilitates a reduction in the micropore content in the resulting materials. Thus, the materials derived from acidic polysaccharides display even lower micropore content than those prepared from polysaccharides which do not have acid functionality (and which normally require the use of an acid catalyst) at the same temperatures.

Generally during the thermal treatment of the expanded polysaccharide, at about 100° C. some carbonisation begins to be evident from the blackening of the polysaccharide material. The desired carbonised mesoporous materials are typically formed at temperatures of from about 100° C. to 300° C. or more, for example up to about 700° C. and possibly up to about 1200° C. Formation of (partially) carbonised materials from polysaccharide precursors at temperatures close to 100° C. is unusual and offers advantages in terms of the energy which is required and the properties that can be achieved. Carbonised materials formed using different treatment temperatures have different compositions and different properties, and in particular different surface properties. At lower temperatures (for example, less than about 300° C.) the mesoporous materials have pore structures similar to the parent expanded polysaccharide. This enables the production of carbonised materials with an unusually low degree of microporosity and an unusually high degree of mesoporosity. These materials also appear to have surface structures which are similar to, or which retain structural features (both physical and chemical) of, the parent polysaccharides (as indicated by surface energy measurements). This may be because the carbonisation process, caused by the thermal treatment, starts from the inside (core) of the polysaccharide particles and moves out. At higher temperatures (typically above about 300° C.) there is a sharp drop in the measured surface energy indicating the formation of materials which progressively bear greater similarity to a traditional carbon. These materials show an increasing amount of microporosity also typical of a more traditional carbon, although they also retain an unusual degree of mesoporosity. For example, increasing temperature may see the loss of carboxy functionality of the parent polysaccharide (at least initially, for example by conversion to carbonyl functionality), and the loss of hydroxyl functionality.

Polysaccharides that form mesoporous materials (polysaccharide derived porous materials) according to the procedure of the present disclosure are able to form ordered structures, in particular helical structures upon recrystallisation/re-association after thermally assisted hydration. These structures self assemble at the nanometer level in the presence of water, to form porous structures of a predominantly mesoporous nature. Removal of water via solvent exchange and (at least partial) carbonisation-inducing thermal treatment by the methods described herein substantially maintains this mesoporous character. The presence (if any) of microporous characteristics may be the product of the internal diameter of such polysaccharide helices, or the crystal packing of such helices and is thus polysaccharide specific. Polysaccharides that form ordered structures, such as helical structures, upon recrystallisation after thermally assisted hydration include, but are not limited to, amylose, amylopectin, pectin, alginic acid, xylan, agarose, agaropectin, xanthan gum, and modified forms of cellulose, chitin and chitosan. Mesoporous materials derived from combinations of these polysaccharides are also within the scope of the present invention, as are combinations of one or more polysaccharides which can form an ordered structure with one or more polysaccharides which do not form such ordered structures.

Without wishing to be bound by theory, the inventors believe that a one characteristic that allows the formation of mesoporous structures and, apparently, helices and/or multiple helices, subsequent to a process of thermal hydration/recrystallisation, appears to be the flexibility and degree of freedom around the glycocidic linkages of the polysaccharide. For instance, the formation of the mesoporous structures is restricted in unmodified Cellulose, (and similarly in unmodified Chitin and Chitosan), and the inventors believe that this is due to formation of very strong intramolecular hydrogen bonding, particularly between the hydroxyl group at the 3 position on the pyranose ring and the oxygen at the five position at the adjacent ring (O3H➔O5') and also between the oxygen at the 6 position with the hydroxyl group at the 2 position on the adjacent pyranose ring (O6➔H—O2'). This promotes the formation of cellulose crystals in the presence of water, as a consequence of the adoption of a linear polymer conformation, induced by the hydrogen bonding. This prohibits the formation of the ordered structures, in particular helix formations, required for the preparation of mesoporous polysaccharides. As noted, the key characteristic that allows the formation of helices and/or multiple helices, subsequently needed to generate mesoporous materials from polysaccharides, is the flexibility and degree of freedom around the glycosidic linkage of the polymer.

It is also possible to prepare mesoporous materials according to the invention from composite precursor materials comprising mixtures of different polysaccharides. These polysaccharides can include one (or more) polysaccharide(s) that do not form ordered structures such helices upon thermal hydration, as long as at least one polysaccharide that does form such an ordered structure upon thermal hydration is present.

The thermally treated mesoporous materials of the present invention can be functionalised or derivatised by various means. In some embodiments, the mesoporous material can be converted into a solid acid by reaction with a traditional acid or with an organic acid or precursor thereof. Suitable traditional acids include Brönsted acids, such as sulfuric acid, and carboxylic acids and Lewis acids such aluminium chloride, zinc chloride or $BF_3$. In other embodiments, metals, such as catalytically useful metals, may be adsorbed onto or otherwise immobilised in the mesoporous material. Hetero-atoms may also be incorporated. In further alternative embodiments the mesoporous material may be prepared in combination with other starting materials, in particular polymeric materials and especially naturally occurring polymeric materials.

Users may select mesoporous materials prepared at different thermal treatment (carbonisation) temperatures for different uses since, as noted above, different carbonisation temperatures result in different surface structures, which may, in turn, react or combine (e.g. adsorb or immobilise) to different extents with functionalising agents (such as the traditional acids) or derivatising agents thereby to provide different properties in use, for example as catalysts.

In some preferred embodiments for preparing a solid acid the preferred acid is sulfuric acid, which may be used as the pure acid or as a concentrated solution in water. By stirring the carbonised mesoporous material with a concentrated solution of sulfuric acid between 20 and 100° C., sulfonic acid sites are formed on the surface of the mesoporous material. One suitable form of mesoporous material for modification with sulfuric acid is one prepared at temperatures high enough to have developed aromatic character but not high enough to have removed most of the polysaccharide-derived oxygen-containing functions, typically hydroxyl functions. Similar considerations apply to functionalisation with other Brönsted acids such as carboxylic acids.

Thus in preferred embodiments mesoporous materials prepared at about 200° C. to about 600° C. can be reacted with, for example, sulfuric acid or a carboxylic acid (or precursor thereof) to produce a solid acid that has both a good level of sulfonic or carboxylic acid functionality and also good surface polarity to assist the reactions of polar molecules, and which moreover is water-stable. This water stability makes the acid-functionalised mesoporous material suitable for catalysing the reactions of organic compounds, such as biomass-derived carboxylic acids, in water. The acid-functionalised materials prepared in this way are mesoporous and maintain a high surface area (typically greater than about 100 $m^2g^{-1}$).

Mesoporous materials with basic functionality may be prepared by analogous methods and are useful in, for example, base catalysed condensation reactions.

The process of preparation of the mesoporous materials can be made more specific or localised. In an example, locally functionalised or derivatised mesoporous materials can be obtained by adding suitable functionalising or derivatising moieties at the locally carbonised locations. In an example, acid species, such as sulfuric acid, are added at the locally carbonised regions so as to produce micro-channel acid-functionalised mesoporous materials for catalytic applications. In this way an array of micro-channels can be produced in a "black and white" contrast fashion, suitable for rapid screening and combinatorial-type studies.

The progress of the process of thermal carbonisation of an expanded polysaccharide material for the preparation of a mesoporous material, functionalised mesoporous material or derivatised mesoporous material can be followed by techniques including thermogravimetric analysis and by $^{13}C$ magic angle spinning NMR spectroscopy. Porosimetry and surface areas can be measured, for example using automated BET measuring devices based, for example, on nitrogen adsorption. Techniques such as electron microscopy and spectroscopic probing can be used to study the surface structure, energy and chemistry.

The thermally treated mesoporous materials of the invention can be used in a number of applications where carbons, mesoporous materials and mesoporous carbons in particular find use. These applications include among others, separation, trapping, catalysis and storage. For example, the mesoporous materials can be used as stationary phases in techniques such as liquid chromatography, including high pressure liquid chromatography (HPLC). In this way, mixtures including complex mixtures can be separated on a mesoporous material using solvent mobile phases. Such mixtures may include mixtures of organic compounds, including for example pharmaceutically useful compounds and mixtures derived from natural product extracts including waxes, mixtures of organometallic compounds, and mixtures of inorganic compounds. The variable or selectable surface energy of the thermally treated mesoporous material is of particular value in separations since surface energies control the retention of eluting compounds or complexes. Thus, mixtures of compounds with different polarities can be separated using different mesoporous materials, and solvents of different polarities can be used to elute different compounds from a stationary phase comprising the mesoporous material. This includes the use of less polar solvents and the use of lower volumes of solvent than might normally be required, when using traditional silica stationary phases.

Thermally treated mesoporous materials according to the invention can advantageously be used in catalysis, including their use as catalyst supports. For example, precious metals or metal complexes can be immobilised on the thermally treated materials and the resulting supported metals can be used as catalysts in gas and liquid phase reactions including those of organic molecules. In this way, mesoporous material-based catalysts can be used in important reactions including hydrogenations, dehydrogenations, Heck and Suzuki and other carbon-carbon bond forming reactions, and oxidation. The mesoporosity of the materials of the invention makes them especially useful for liquid phase reactions such as those including reactions of large molecules. The variable or selectable surface structure of the thermally treated mesoporous materials is useful, for example to assist metal binding and to effect molecular diffusion.

More particularly, the acid functionalised mesoporous materials can be used as catalysts including the catalysis of reactions of organic compounds. Reactions can include the aqueous reactions of water-soluble organic compounds as well as other reactions under aqueous or partially aqueous conditions. This takes advantage of the stability of the thermally treated mesoporous materials towards water, including hot water, and also the presence of polar and other groups on the acid functionalised mesoporous materials, especially on those materials prepared in the temperature range of about 200° C. to about 600° C. The mesoporosity of the acid-functionalised materials also enables the diffusion of molecules, including quite large molecules, at useful rates: This diffusion does not have a large detrimental effect on the rates of reactions catalysed by these acid-functionalised mesoporous materials. Reaction types that the acid-functionalised mesoporous materials can catalyse include esterifications, isomerisations, dehydrations, cyclisations, alkylations and acylations.

Examples of reactions of importance that the functionalised mesoporous materials (in particular the acid-functionalised mesoporous materials) can catalyse include the reactions of so called biomass platform molecules. These are compounds obtained from the fermentation or other cracking process on biomass. Biomass is renewable biological material including tree materials, plants, grasses, agricultural residues and by-products and food residues and by-products. Fermentation processes on biomass normally produce aqueous mixtures of compounds. These compounds include those identified as platform molecules which can be produced in very large quantities, and which can be converted into many other useful compounds. Platform molecules of interest include succinic acid, glycerol, lactic acid, fumaric acid, levulinic acid, glutamic acid, malic acid, 3-hydroxypropionic acid, 2,5-furan dicarboxylic acid, glucaric acid, itaconic acid, sorbitol and xylitol. These molecules can be converted into other molecules including marketable products and intermediates, through the use of acid-catalysis, for example. These functionalised mesoporous materials (in particular the acid-functionalised mesoporous materials) can be used to convert compounds derived directly from biomass into numerous valuable compounds including esters, dicarboxylic acid monoesters, dicarboxylic acid esters, anhydrides, lactones, amides, dicarboxylic acid monoamides, dicarboxylic acid diamides, cyclic ethers, as well as oligomeric and polymeric substances.

The following non-limiting Examples are illustrative of the invention.

EXAMPLE 1

A method for preparation of mesoporous materials from acid containing polysaccharide precursors.

Figure 2:
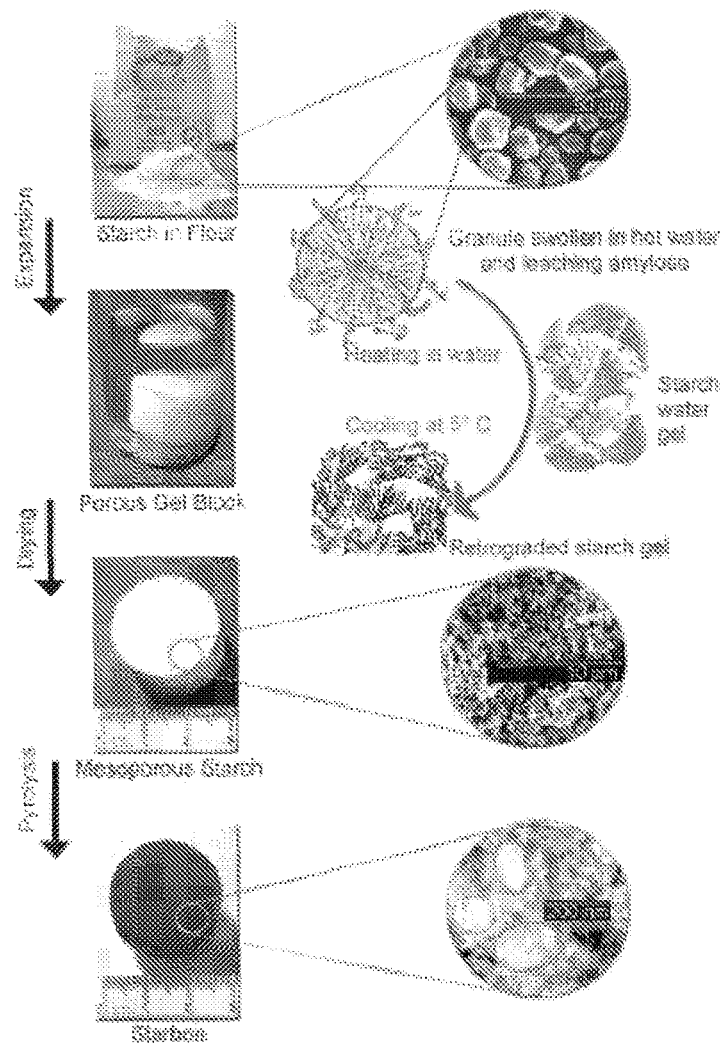
FIG. 2 is diagram indicating stages in converting polysaccharide (using starch from flour as an example) into mesoporous material.

The overall procedure followed to convert a polysaccharide into a mesoporous material according to the invention is summarised in FIG. 2 with reference to the treatment of starch. Treatment of the polysaccharides of the present disclosure uses the same technique. The various procedures involved in the main steps of expansion, solvent exchange and drying, and finally thermal treatment are exemplified below in parts 1, 2 and 3 respectively for the acidic polysaccharides alginic acid and pectin.

Part 1—Preparation of Polysaccharide Derived Porous Material

Expanded polysaccharide was prepared either by (a) thermal preparation or (b) microwave preparation (a) Thermal Preparation of Polysaccharide Derived Porous Material 100 g of either alginic acid or pectin and 2L of deionised water was stirred at 700 rpm for ten minutes in a modified domestic pressure cooker prior to heating (Volume=3L; Operating conditions 120° C./80 Kappa). The lid component of the device was modified with an aluminium enclosure facilitating insertion of a thermocouple. The system was heated to 120° C. (30 minutes) and held at this temperature for a further forty five minutes. Upon returning to atmospheric pressure, the lid was detached, and the resulting solution decanted into powder drying jars. The vessels were then sealed and the gels retrograded at 5° C.

(b) Microwave Assisted Preparation of Polysaccharide Derived Porous Material 0.25 g of either alginic acid or pectin was mixed with 5.0 ml of distilled water in a commercial microwave reactor vessel, placed in the reactor and the pressure sensor attached. The sample was then heated to the desired temperature (i.e. 90° C.-180° C., typically 130° C.) over 150 seconds in a CEM Discover microwave reactor with computer controlled operation. Upon returning to atmospheric pressure, the vessel remained sealed and was placed in a refrigerator and left to recrystallize at 5° C. for a desired time. The resulting gel was then solvent exchanged and dried.

Part 2—Solvent Exchange

Water was removed from the hydrates and recrystallised (expanded) polysaccharide by means of a solvent exchange procedure. An initial volume of ethanol (10% v/v with water) was added and stirred for 2 hours. A second volume of ethanol (20% v/v) was then added followed by 2 hours stirring. This was followed by a further addition of ethanol (30% v/v) and another 2 hours stirring. A fourth volume of ethanol (50% v/v) was then added followed by another 2 hours of stirring. The resulting suspension was allowed to settle or was centrifuged. The excess solvent was decanted. A volume of ethanol was then added, equivalent to the volume of water used in the gelatinization stage and stirred for a time period of from 2 hours to overnight. The suspension was then allowed to settle and the excess solvent was decanted. This process of adding ethanol, stirring and removing was repeated twice. The product was then filtered until partially dry. The resulting solid at this point was then dried via rotary evaporation, and then held overnight at 40° C. in a vacuum oven. Alternatively, the residual ethanol can be removed by supercritical $CO_2$ drying.

Part 3—Thermal Treatment for Conversion of Expanded Polysaccharide into Desired Mesoporous Material ("Carbonisation")

Samples of dry mesoporous (that is, thermally hydrated, recrystallised and solvent exchanged) alginic acid or pectin were converted into the desired mesoporous materials by oven heating to the desired temperature (>170° C.) via a stepwise heating program in a nitrogen atmosphere (100 mL $N_2$/minute). Different treatment regimes were used of which the maximum temperatures for alginic acid were 180, 250, 450 or 600° C., while for pectin maximum temperatures of 200, 400 or 600° C. were used.

The stepwise heating programs followed in the examples herein were (RT indicates room temperature):

(i) For samples prepared at 180° C.:
RT—140° C.—10K/min
Isothermal: 30 minutes
140-150° C.—2K/min
Isothermal: 30 minutes
150-180° C.—1K/min
Samples were held at the final temperature of 180° C. for 30 minutes and allowed to cool for about 1 hour (ii) For samples prepared at 200° C.:
RT—140° C.—10K/min
Isothermal: 30 minutes
140-150° C.—2K/min
Isothermal: 30 minutes
150-180° C.—1K/min
Isothermal: 30 minutes
180-200° C.: 1K/min
Samples were held at the final temperature of 200° C. for 30 minutes and allowed to cool for about 1 hour (iii) For samples prepared at 250° C.:
RT—140° C.—10K/min
Isothermal: 30 minutes
140-150° C.—2K/min
Isothermal: 30 minutes
150-180° C.—1K/min
Isothermal: 30 minutes
180-230° C.: 1K/min
Isothermal: 30 minutes
230-250° C.—1K/min
Isothermal: 30 minutes
Samples were held at the final temperature of 250° C. for 30 minutes and allowed to cool for about 1 hour (iv) For samples prepared at 320° C.:
RT—140° C.—10K/min
Isothermal: 30 minutes
140-150° C.—2K/min
Isothermal: 30 minutes
150-180° C.—2K/min
Isothermal: 30 minutes
180-230° C.: 1K/min
Isothermal: 30 minutes
230-250° C.—1K/min
Isothermal: 30 minutes
250-280° C.—1K/min
Isothermal: 30 minutes
280-300° C.—1K/min
Isothermal: 30 minutes
300-320° C.—1K/min
Isothermal: 30 minutes
Samples were held at the final temperature of 320° C. for 30 minutes and allowed to cool for about 2.5 hour (v) For samples prepared at 400° C.:
RT—140° C.—10K/min
Isothermal: 30 minutes
140-170° C.—2K/min
Isothermal: 30 minutes
170-190° C.—2K/min
Isothermal: 30 minutes
190-230° C.: 1K/min
Isothermal: 30 minutes
230-260° C.—1K/min
Isothermal: 30 minutes
260-280° C.—1K/min
Isothermal: 30 minutes
280-300° C.—1K/min
Isothermal: 30 minutes
300-350° C.—2K/min
Isothermal: 30 minutes
350-400° C.—5K/min
Isothermal: 30 minutes
Samples were held at the final temperature of 400° C. for 30 minutes and allowed to cool for about 3 hours (vi) For samples prepared at 450° C.:
RT—140° C.—10K/min
Isothermal: 30 minutes
140-170° C.—2K/min
Isothermal: 30 minutes
170-190° C.—2K/min
Isothermal: 30 minutes
190-230° C.: 1K/min
Isothermal: 30 minutes
230-260° C.—1K/min
Isothermal: 30 minutes
260-280° C.—1K/min
Isothermal: 30 minutes
280-300° C.—1K/min
Isothermal: 30 minutes
300-350° C.—2K/min
Isothermal: 30 minutes
350-400° C.—5K/min
400-450° C.—10K/min
Samples were held at the final temperature of 450° C. for 30 minutes and allowed to cool for about 3.5 hours (vii) For samples prepared at 600° C.:
RT—140° C.—10K/min
Isothermal: 30 minutes
140-170° C.—2K/min
Isothermal: 30 minutes
170-190° C.—2K/min
Isothermal: 30 minutes
190-230° C.: 1K/min
Isothermal: 30 minutes
230-260° C.—1K/min
Isothermal: 30 minutes
260-280° C.—1K/min
Isothermal: 30 minutes
280-300° C.—1K/min
Isothermal: 30 minutes
300-350° C.—2K/min
350-400° C.—5K/min 400-600° C.—10K/min
Isothermal: 30 minutes
Samples were held at the final temperature of 600° C. for 30 minutes and allowed to cool for about 4.5 hours

EXAMPLE 2

Figure 3:
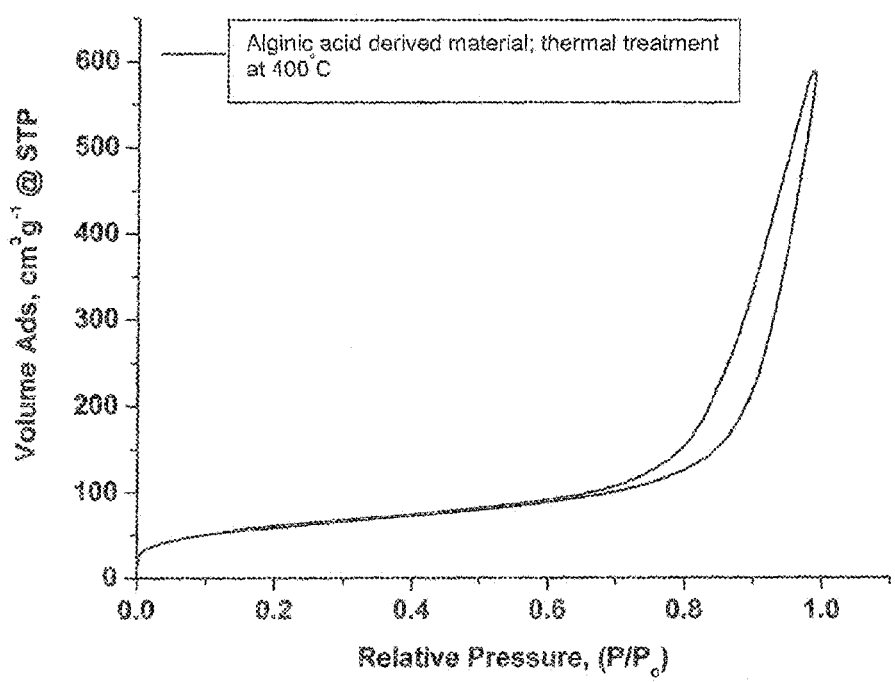
FIG. 3 shows nitrogen adsorption/desorption isotherm for Alginic Acid derived mesoporous material samples prepared by a thermal treatment regime with a maximum temperature of 450° C.

Characterisation of expanded alginic acid and mesoporous materials derived from expanded alginic acid by thermal treatment (carbonisation):

Mesoporous materials derived from expanded alginic acid were prepared according to Example 1. Data from nitrogen proximity of alginic acid derived materials are displayed in Table 1. The nitrogen adsorption/desorption proceeds via a classical Type IV isotherm for all samples (FIG. 3). All samples showed excellent mesoporous characteristics. Mesoprous volumes throughout the range of preparation temperatures are particularly impressive and consistent (circa 1 $cm^3g^{-1}$). Promisingly, the pore size distribution appears to be of a relatively consistent and symmetrical shape, with a maximum in all examples around ~14 nm, independent of preparation temperature, indicating a degree of stability in the parent mesoporeg structure (FIG. 4). All samples, showed remarkably low micropore content (<0.07 $cm^3g^{-1}$) throughout the preparation temperature range. The shape and size of the alginic acid materials prepared at different temperatures remains relatively consistent with porous surfaces visible by SEM (FIG. 7). The self carbonizing behaviour of thermally expanded polysaccharides with innate acid functionality, such as alginic acid and pectin, is advantageous over comparable materials without such acid functionality, not only with regard to process steps, but also with regards to micropore content in the materials. These carbonised mesoporous materials derived from acidic polysaccharides display even lower micropore content than the mesoporous materials prepared form non-acidic polysaccharides, as can be seen by comparing $V_{meso}$ and $V_{micro}$ for alginic acid derived material prepared using a maximum temperature of 450° C. in Table 1 with the equivalent results for amylose derived material prepared using the same thermal treatment regime, shown in Table 4 below.

Measurement of the adsorption/desorption of diethylamide, from the gas phase, at two different vapor pressures, onto mesoporous alginic acid was conducted. The difference between the amount adsorbed and the amount desorbed allowed a calculation of the availability of free carboxylic groups at the surface. A loading of 0.99 mol/g (+/−0.1) was calculated (Table 2). Furthermore, as the surface area of the material is known, the distance between individual —COOH groups can also be calculated—approximately 0.7 nm between every —COOH at the surface.

TABLE 2

Measurement of the heat of Adsorption and Desorption, of Triethylamine onto the surface of mesoporous Alginic Acid.

| Material | Temperature, ° C. | $\Delta H_{ADS}$, KJ $mol^{-1}$ | $\Delta H_{DES}$, KJ $mol^{-1}$ | $\Delta$Mass, % | % Loading of —COOH, mmol/g |
|---|---|---|---|---|---|
| Alginic Acid 1 (202 $m^2g^{-1}$) | 50 | 398.2 | 230.0 | 8.8 | 0.88 |
| Alginic Acid 1 (202 $m^2g^{-1}$) | 40 | 332.0 | 275.0 | 11.0 | 1.10 |
| Average | 45 | 365.1 | 252.0 | 9.9 | 0.99 |

The progress of thermal modification or carbonisation has been followed by porosimity, infrared spectroscopy (FT-IR), and thermogravimetric analysis (TG/dTG) and scanning electron microscopy (SEM). FT-IR analysis indicates progress from a hydroxyl, oxygenated functional group rich surface to an increasingly more carbon like surface. Peaks in the region 2500-2680 $cm^{-1}$ are attributed to dimerism carboxylic acid, via a head to head interaction. These peaks disappear in unison with the peak associated with the carboxylic group (~1722 $cm^{-1}$), and hydroxyl functionality (>3100 $cm^{-1}$) and this disappearance can be followed with temperature. At 450° C., the carboxylic peak intensity has reduced significantly and has been replaced by the stretching vibrations of other carbonyl containing groups such as ketenes, lactones and baldheads. The peak found at 1440 $cm^{-1}$ is typical of C—H bending mode. The development of peaks at ~879, 812, and 751 $cm^{-1}$ is attributed to the formation of aromatic species (FIG. 5). This is most evident in samples prepared above 500° C. Loss of the oxygen containing functionality with increasing preparation temperature is in good agreement with thermogravimetric data, as evidenced by a change in the mass loss (78 to 4%; expanded alginic acid to alginic acid carbonised at a maximum temperature of 600° C.; FIG. 6(a) and the peak position in the dTG (FIG. 6(b)). The dTG shows two distinct decomposition processes for alginic acid. The first peak at 222° C. corresponds to the concurrent loss of carboxylic acid and hydroxyls involved in network formation. A secondary decomposition occurs with the loss of further isolated COOH groups at 257° C.

TABLE 1

Textural Properties of Mesoporous alginic acid material (A), and carbonised alginic acid material, as determined by nitrogen porosimetry analysis.

| Preparation Temperature, ° C. | $S_{BET}$, $m^2g^{-1}$ | $V_{meso}$, $cm^3g^{-1}$ | *$V_{micro}$, $cm^3g^{-1}$ | $APD_{BJH}$, (Ads), nm | $APD_{BJH}$, (Des), nm | $^aE_{DR}$, KJ $mol^{-1}$ | Total Pore Volume, $cm^3g^{-1}$ |
|---|---|---|---|---|---|---|---|
| A | 202 | 1.0 | 0.01 | 8.4 | 16.9 | 5.4 | 1.0 |
| 250 | 202 | 1.1 | 0.00 | 9.8 | 18.8 | 5.9 | 1.1 |
| 450 | 205 | 0.9 | 0.01 | 8.1 | 17.4 | 5.5 | 0.9 |
| 600 | 334 | 0.9 | 0.07/0.19$^a$ | 2.3 | 18.4 | 6.8 | 0.9 |

*Calculated using the t-plot method.
$^a$Calculated using the Dubinin-Radushkevich Model.

EXAMPLE 3

Characterisation of mesoporous pectin and mesoporous pectin derived materials.

Data derived from nitrogen adsorption/desorption of pectin derived materials are displayed in Table 3. The nitrogen isotherm proceeds via a classical Type IV isotherm for all samples, particularly the carbonaceous samples, which possessed a plateau region at relative pressures approaching 1—indicative of a well ordered pore structure (FIG. 8). All samples showed excellent mesoporous characteristics, including particularly large mesopore volumes at low preparation temperatures. Interestingly, selection of preparation temperature allows direction of the mesopore size (FIG. 9). All samples, showed remarkably low micropore content ($<0.05$ $cm^3g^{-1}$) throughout the preparation temperature range.

TABLE 3

Textural Properties of mesoporous pectin material (P), and the carbonised pectin material, as determined by nitrogen porosimetry analysis.

| Preparation Temperature, °C. | $S_{BET}$, $m^2g^{-1}$ | $V_{meso}$, $cm^3g^{-1}$ | *$V_{micro}$, $cm^3g^{-1}$ | $APD_{BJH}$ (Ads), nm | $APD_{BJH}$ (Des), nm | $^aE_{DR}$, KJ $mol^{-1}$ | $^b$Total Pore Volume, $cm^3g^{-1}$ |
|---|---|---|---|---|---|---|---|
| P | 485 | 1.7 | 0.01 | 14.9 | 27.5 | 5.6 | 4.2 |
| 200 | 246 | 1.4 | 0.00 | 10.5 | 16.5 | 5.8 | 1.4 |
| 400 | 246 | 0.8 | 0.01 | 5.7 | 11.0 | 5.8 | 0.8 |
| 600 | 233 | 0.5 | 0.04 | 2.7 | 10.4 | 5.8 | 0.5 |

*Calculated using the t-plot method.
$^a$Calculated using the Dubinin-Radushkevich Model.
$^b$Calculated including contributions from pores sizes above 50 nm.

The progress of thermal modification or carbonisation has been followed by proximity, infrared spectroscopy (FT-IR), and thermogravimetric analysis (TG/dTG) and scanning electron microscopy (SEM). FT-IR analysis indicates progress from a hydroxyl, oxygenated functional group rich pectin surface to an increasingly more carbon like surface. Disappearance of the carboxylic group (~1720 $cm^{-1}$), and hydroxyl functionality (>3100 $cm^{-1}$) can be followed with temperature. At 400° C., the carboxylic peak intensity has reduced significantly and has potentially been replaced by the stretching vibrations of other carbonyl containing groups such as ketones, lactones and aldehydes. The peak found at 1430 $cm^{-1}$ is typical of a C—H bending mode. Concurrently, the development of a peak at ~870 $cm^{-1}$ is attributed to the formation of aromatic species (FIG. 10). This is particularly evident in samples prepared above 500° C. Loss of the oxygen containing functionality with increasing preparation temperature is in good agreement with thermogravimetric data, as evidenced by a change in the mass loss (57 to 0%; pectin to carbonised pectin treated at a maximum temperature of 600° C.; FIG. 11(A)) and peak position in the dTG (FIG. 11(B)). The presence of only one significant peak in the dTG of the decomposition of Pectin indicates potentially that all —COOH groups are involved in the mesoporous network.

Interestingly, particle size and shape remains consistent throughout the preparation temperature range (FIG. 12).

EXAMPLE 4

Preparation of further polysaccharides and polysaccharide composites, and materials derived therefrom.

Part 1—Preparation of Polysaccharide Derived Porous Material (Expanded Polysaccharide)

Expanded forms were prepared for a number of polysaccharides and composite mixtures of polysaccharides, using the procedures given in Example 1, but substituting with the following polysaccharides:

(i) Individual polysaccharides:

cellulose, chitosan, amylopectin, xylan, amylose; and (ii) Polysaccharide composites:

alginic acid+cellulose (80/20); alginic acid+cellulose (20/80); alginic acid+chitosan (50/50); alginic acid+amylose (80/20); alginic acid+amylose (20/80); alginic acid+xylan (20/80); alginic acid+K-carageenan (80/20); amylose+scleroglucan (80/20); and high amylose corn starch+alginic acid (90/10) (all ratios wt/wt).

Part 2—Solvent Exchange

The solvent exchange procedure of Example 1 was followed.

Part 3—Thermal Treatment for Conversion of Expanded Polysaccharide into Desired Mesoporous Material ("Carbonisation")

(a) Alginic Acid/Chitosan (50/50); Alginic Acid/Cellulose (80/20)

Expanded and solvent exchanged samples of alginic acid+chitosan (50/50) (wt/wt) and alginic acid+cellulose (80/20) (wt/wt) were subjected to thermal treatment following the 450° C. regime given in Example 1 to form the carbonised material.

(b) amylose

Expanded and solvent exchanged amylose was first suspended in acetone, then acidified with a solution of para-toluene sulphonic acid in acetone (1 g acid to 1 ml acetone). Acetone was removed from the solution in a rotary evaporator at 35° C. Thereafter the acidified material was converted into carbonised material by following the 450° C. thermal treatment process given in Example 1.

EXAMPLE 5

Characterisation of polysaccharides and polysaccharide composites and materials derived therefrom.

(i) Polysaccharide & Polysaccharide Composites.

The textural properties of a variety polysaccharides samples and composites are shown in Table 4. Samples prepared directly from Cellulose and Chitosan, are not particularly promising with regard to mesoporous characteristics, displaying little pore volume in the mesoporous region. By contrast, amylose and xylan display very promising mesopore characteristics including very desirable pore volumes in the mesoporous region. SEM analysis shows the porous surfaces of these two expanded polysaccharides (FIG. 13). The properties of amylopectin are somewhat intermediate between cellulose and amylose, as prepared by this method. Comparison of the pore size distribution for these materials reveals a very broad profile for amylose compared to a more discrete narrow symmetrical profile for xylan (FIG. 14). Cellulose shows little developed pore volume in the mesopore region, with the peak shown attributed to an artefact of nitrogen evaporation. Amylopectin by contrast shows volume in the high pore diameters of the mesopore region.

Composites of alginic acid, with amylose, xylan, cellulose (at 80/20)(wt/wt), K-carageenan, all show promising mesoporous characteristics desirable in the precursor material for the preparation of the desired carbonaceous materials.
(ii) Materials Derived from Mesoporous Amylose, and the Composites of Alginic Acid & Chitosan (50/50) (wt/wt), and Cellulose & Alginic Acid (80/20) (wt/wt).

The textural characteristics of the thermally treated materials are described in Table 4. Thermally treated amylose (using p-toluene sulphonic acid as the catalyst for carbonisation), displays the most promising mesoporous characteristics. Materials prepared from the composites with alginic acid display satisfactory mesoporous textural characteristics. All samples show comparable micropore content as compared with non-composite materials, but considerably higher micropore content than materials prepared from mesoporous alginic acid alone or mesoporous pectin alone. The pore size distributions for these materials and the FT-IR spectra of the parent polysaccharide compared to the resulting carbonaceous material are shown in FIGS. 15 and 16 respectively. The mesoporous region is considerably more developed in the amylose derived material. The IR spectra show the typical transition from polysaccharide to the desired thermally treated material as discussed previously. For the alginic acid/chitosan composite, the presence of nitrogen is evidenced by peaks at 1250-1350 $cm^{-1}$, assigned to aromatic C—N bonds.

TABLE 4

Textural Properties of polysaccharide precursors for use in the preparation of thermally treated mesoporous type materials. Also included are examples of thermally treated materials derived from composites and from amylose.

| Sample Component(s) | $S_{BET}$, $m^2g^{-1}$ | $V_{meso}$, $cm^3g^{-1}$ (BJH) | $V_{micro}$, $cm^3g^{-1}$ (t-plot) | $APD_{BJH}$, (Ads), nm | $APD_{BJH}$, (Des), nm | $E_{DR}$,* KJ $mol^{-1}$ | Total Pore Volume, $cm^3g^{-1}$ |
|---|---|---|---|---|---|---|---|
| Cellulose | 35 | 0.09 | 0.01 | 5.0 | 9.3 | 6.6 | 0.10 |
| Chitosan | 22 | 0.07 | 0.01 | 8.1 | 22.0 | 5.9 | 0.07 |
| Amylopectin | 41 | 0.28 | 0.00 | 13.8 | 28.2 | 6.1 | 0.28 |
| Xylan | 170 | 0.66 | 0.00 | 6.9 | 12.3 | 5.6 | 0.66 |
| Amylose | 207 | 0.86 | 0.01 | 7.3 | 15.8 | 5.9 | 0.86 |
| Alginic Acid + Cellulose (80/20) | 163 | 0.39 | 0.00 | 4.0 | 7.9 | 5.9 | 0.39 |
| Alginic Acid + Cellulose (20/80) | 67 | 0.15 | 0.00 | 5.1 | 7.4 | 5.7 | 0.15 |
| Alginic Acid + Chitosan (50/50) | 152 | 0.33 | 0.00 | 4.0 | 6.9 | 4.8 | 0.33 |
| Alginic Acid + Amylose (80/20) | 195 | 0.63 | 0.01 | 5.4 | 10.6 | 5.0 | 0.63 |
| Alginic Acid + Amylose (20/80) | 172 | 0.59 | 0.01 | 5.2 | 9.8 | 5.5 | 0.60 |
| Alginic Acid + Xylan (20/80) | 129 | 0.62 | 0.00 | 8.8 | 14.6 | 5.8 | 0.62 |
| Alginic Acid + K-Carageenan (80/20) | 150 | 0.66 | 0.01 | 7.3 | 14.1 | 5.9 | 0.66 |
| Amylose + Scleroglucan (80/20) | 126 | 0.52 | 0.01 | 7.7 | 14.5 | 5.9 | 0.52 |
| High Amylose Corn Starch + Alginic Acid (90/10) | 189 | 0.44 | 0.01 | 4.0 | 7.6 | 5.7 | 0.44 |
| Carbonised Alginic Acid/Chitosan (50/50) material @ 450° C.[a] | 173 | 0.21 | 0.03/0.10* | 1.1 | 8.5 | 7.2 | 0.24 |
| Carbonised Cellulose/Alginic Acid (80/20) material @ 450° C.[a] | 255 | 0.25 | 0.04/0.15* | 1.1 | 10.2 | 5.8 | 0.29 |
| Carbonised Amylose material @ 450° C.[b] | 447 | 0.52 | 0.15/0.22* | 2.1 | 12.6 | 11.8 | 0.53 |

*Micropore volume and surface energy characteristic calculated using the Dubinin-Radushkevich Model.
[a]Samples were prepared using the heating cycle as defined earlier.
[b]Sample doped with catalytic amount of p-Toluene Sulfonic acid as is typical in preparation of non-composite materials and as outlined above.

EXAMPLE 6

Characterisation of certain alginic acid derived materials
Thermal Analysis of Alginic Acid Derived Materials and Comparison to Starch Derived Materials Expanded alginic acid material was analysed by thermogravimetric analysis and the thermal behaviour of the expanded alginic acid was compared with that of the neutral expanded starch polysaccharide composite, and acid doped expanded starch prepared as indicated above.

These materials were heated at 5° C. min$^{-1}$ under a nitrogen atmosphere, upto 600° C. (FIG. 18(A)). Acid doped starch material commenced decomposition at between 130-180° C., as the acid catalysed dehydration of the polysaccharide proceeded, resulting in an initial mass loss of 30%. The secondary charring decomposition step (180-600° C.) was a slower mass loss process, and resulted in a total mass loss of 71% upto 600° C. Neutral starch material decomposition proceeded through a sharp sudden decomposition (ca. 280° C.), as evidenced by the sharp intense dTG peak at 320° C. (FIG. 18(B)). This resulted in a mass loss of 80%, with only a further 5% mass loss upon continued heating to 600° C.

The expanded alginic acid (AS1) material presented thermal properties between the two starch profiles. Initial decomposition started at 170° C., under the heating conditions used. This decomposition was much broader than for the acid doped starch, and asymmetric, perhaps as result of more than one main decomposition process. The inventors suggest that the main decomposition is likely to be a decarboxylation step, with free surface groups evolving first followed by more strongly bound dimers forming the hydrogen bond network. Thus, this initial mass loss of 48% was thought to be the result of decarboxylation and dehydration of the alginic acid polysaccharides. The secondary charring decomposition, resulted in a further 32% mass loss. The total mass yield upon the inert decomposition of alginic acid material up to 600° C. was therefore 200 mg per gram of AS1.

Transmission Electron Microscopy (TEM) Analysis

TEM image analysis of thermally treated expanded alginic acid material (AS1) present very interesting material nano structure and pore morphology (FIG. 19).

Heating of the porous AS1 materials to 200° C., resulted in the formation of unusual tube like structures emanating from the bulk material (FIGS. 19(A) and 19(B)). These tube like structures, were relatively long (ca. 100 nm), with diameters of ca. 30 nm. Interestingly, TEM images indicate that the tubes may have an internal void, with an internal diameter of ca. 8 nm (FIG. 19(D)). However upon heating further, these structures appeared to coalesce or condense to form a more typical type of porous structure (FIG. 20 (A)).

Meso scale pores (i.e. diameters between 2-50 nm) are clearly visible in all images, with material decomposition seemingly a bulk phenomenon. This is in contrast to expanded starch derived materials, where, the inventors believe, carbonisation is initiated at the pore surface at which the acid catalyst is physisorbed. Alginic acid material prepared at 300° C. appears more homogeneous in nature, as compared to TEM images previously reported for expanded starch derived materials. As the temperature increases from 300 to 1000° C., the aromatic character and therefore the conductivity of the species increases (as can be demonstrated by solid state NMR), and TEM images become clearer. Mesopores can be clearly seen, with slit type pore morphology typical; in agreement with nitrogen isotherm shapes. Some larger (>200 nm) pore sizes can be seen, indicating some macropore character is retained upon thermal treatment (carbonisation). Layered rod like carbon sheets material structure appears typical, with layers overlapping and interconnecting.

In comparison to the supercritical $SiO_2$ dried materials, thermally dried expanded alginic acid derived materials (A1) present structures that are far more condensed, with the open large mesopore structure clearly, which is visible for AS1 derived materials, somewhat reduced in dimensions (FIG. 21). Mesopores are still visible, but of a smaller size. This is reflected in proximity data, with rod-like interconnected nanometer structure again present in these materials.

EXAMPLE 7

Expanded alginic acid derived thermally treated material as a novel chromatographic stationary phase.

Introduction

In typical liquid chromatography (LC) applications, the stationary phase chemistry which is most commonly employed is reverse-phase $C_{18}$ silica based materials. However, highly polar compounds such as carbohydrate related compounds (e.g. neutral sugars, sugar phosphates or sugar alcohols) show minimal retention on these organo-modified bonded phases. As a result, these compounds elute close to the void volume affording minimal chromatographic separation. Knox et al. (J. H. Knox, B. Kaur, and G. R. Millward, Journal of Chromatography, (1986), 352, 3-25) developed a porous graphitic carbon (PGC) as an alternative column packing material, which is currently available under the commercial trade name "Hypercarb™". This carbon stationary phase is prepared by the impregnation of spherical silica gel particle templates with phenolic resin, followed by carbonization, silica dissolution, and high temperature graphitisation. This approach is limited and wasteful, and is complicated by a demand for spherical silica gel particles, with particular pore structure. High temperatures required to make the material inert to the silica removal step are energy intensive, and not convenient in conventional preparation ovens. However, the chemistry of this PGC as a stationary phase is useful from an application viewpoint, being chemically very inert and stable over the entire pH range, allowing the use of 'MS friendly' mobile phases without the need for additive ion-pairing reagents.

In terms of chromatography, a carbon graphitic phase presents a homogeneous surface which is hydrophobic and highly polarisable. The retention mechanism is believed to occur via a combination of hydrophobic eluent-analyte interactions, electronic interactions of polarisable (or polarised) analyte functional groups with delocalized π electron systems of the graphitic layers. Hanai (T. Hanai, Journal of Chromatography A, (2003), 989, 183-196) has described the graphitic carbon surface as acting as a Lewis base toward polar solutes and dispersive interactions with aromatic solutes. Therefore, retention runs in an opposite manner than for $C_{18}$ phases; that is, the more polar the analyte the greater the retention.

Alginic Acid Derived Thermally Treated Materials as Novel Stationary Phase Media.

The polysaccharide materials of the present disclosure, can be prepared in a facile manner to in comparison to the above described PGC materials. Materials derived by thermal treatment of expanded alginic acid are particularly attractive stationary phase candidates, as they present minimal micropore content. This is a desirable character in a stationary phase, as it avoids reduction in separation efficiency as a consequence of irreversible high energy analyte adsorption in sub 2 nm pores. Furthermore, alginic acid derived materials present higher mesopore volumes and sizes as required for good mass transfer and flow, and also lower micropore content as compared to expanded starch derived thermally treated materials.

The porous polysaccharide derived carbonaceous materials of the present disclosure present an interesting alternative to the PGC material described above. It is noted, for example that by selecting preparation temperature, it is possible to determine the surface chemistry. It is possible to produce material with mixed surface functionality, and varying degrees of aromatic character. Therefore, the inventors consider it possible to produce stationary phases with tuneable aromatic properties, and in turn moderate the "π" character of the surface. The expanded polysaccharide thermally treated materials of the present disclosure afford greater flexibility in terms of surface chemistry, with the added benefit of being able to select textural properties by polysaccharide choice. Furthermore, the materials of the present disclosure provide material with developed aromatic character at relatively low temperatures, in comparison to temperatures required for prior art materials, reducing the energy consumption of material preparation.

Alginic Acid Derived Thermally Treated Material Prepared at 1000° C. As a Stationary Phase for LC Coupled to Mass Spectrometry (LC-MS) Applications Preparation of the Packed Column Alginic acid derived thermally treated material, prepared at 1000° C. (AS1000) by the methods discussed above, was hand packed into a 50.0 mm×4.6 mm stainless steel column via a dry packing technique. The column was wetted and compressed by flowing solvent (e.g. acetone, water or acetonitrile) continuously across the packed phase for 48 h, to enable optimum column packing density. The column was then equilibrated in the mobile phase, (50:50 water:acetonitrile), for a further 24 h before use. The hand packed column showed good flow rates (ca. 400 μL min$^{-1}$) and back pressure characteristics (ca. 5000-6000 psi).

Particle Size Distribution

The PGC material described above is known to possess a relatively discreet particle size distribution (e.g. spherical/diameter ca. 3, 5 or 7 μm). The particle size distribution of the AS1000 material used in the column was analysed by using dynamic light scattering detection. As a comparison, material derived from conventional expanded starch by treatment at 1000° C. (ST1000) was also analysed, as was a sample of material derived from regular sized mesoporous expanded starch particles by treatment at 1000° C. (ST1000P). Results are shown in FIG. 22.

The AS1000 material demonstrated a bimodal particles size distribution with the two corresponding maxima at 91 nm and 531 nm, with an average value of 227 nm. The inventors suggest that the higher value of 531 nm is probably the more realistic value. Previous SEM images indicate the irregularity of the particle shape and size for AS1000, and values indicated here are thought to be reflective of this. Rod like shapes would generate two dimensions that would be measured here, generating the bimodal distribution. The same is also true for the ST1000 materials, but for much smaller sizes (20 and 150 nm). ST1000P materials demonstrated more regular shape and narrower particle size distribution, reflective of the precursor material, although size and dimensions in comparison to the starch particles have diminished upon carbonisation.

Separation of Mono-, Di- and Trisaccharides

To illustrate the potential of the AS1000 material for the separation of highly polar compounds, the neutral sugars, glucose (mono-), sucrose (di-) and raffinose (tri-saccharide) were chosen as represenatative analytes. Standard solutions of glucose, sucrose, and raffinose were prepared in water at a concentration of 50 μM (each). The compounds were separated on the column without derivatisation and detected using negative ion mode electrospray quadrupole ion trap mass spectrometry. The results are shown in FIG. 23. The LC-MS method as used to test the AS1000 phase for the separation of these neutral carbohydrates was previously reported by Antonio et al ((a) C. I. P. Antonio, Development and Application of LC-MS approaches for studying the plant primary metabolite, PhD Thesis, University of York, May 2008; (b) C. Antonio, T. Larson, A. Gilday, I. Graham, E. Bergstrom, and J. Thomas-Oates, Journal of Chromatography A, (2007), 1172, 170-178) who separated these compounds on a PGC stationary phase. Standard compounds were analysed in triplicate to demonstrate repeatability, system robustness, and to identify retention times for each compound (Table 7). The system showed excellent repeatability for these standard solutions. Separation profiles are displayed as the extracted ion chromatogram for each analyte (FIG. 23).

Under these chromatographic conditions, glucose eluted at 2.33 min. Comparison of this retention time with the calculated system void volume indicated the retention of glucose, as the void volume eluted at 1.80 min. This promising result was comparable with previously reported glucose elution times of 2.84 min for a PGC column of 100 mm length. Considering the short length of the column used here, the separation of the three saccharides proved to be very efficient. Peak shapes were relatively symmetrical for sucrose and raffinose. A less intense signal was observed for glucose, due its lower detector response in the negative ion mode.

TABLE 1

Nominal m/z values, retention times and intra-day repeatability of retention times obtained for standard compounds using negative ion name of your column-LC-ESI-QIT-MS.

| Standard compounds | Diagnostic ion (m/z) | $t_R$ (min) |
|---|---|---|
| Glucose | 225 [M + HCOO]$^-$ | 2.33 |
| Sucrose | 387 [M + HCOO]$^-$ | 6.88 |
| Raffinose | 549 [M + HCOO]$^-$ | 9.47 |
| Stachyose | 549 [M + HCOO]$^-$ | 9.47 |
| Verbascose | 549 [M + HCOO]$^-$ | 9.59 |

HPLC conditions: AS1000 Starbon column (50 mm × 4.6 mm i.d.), 5 μL injection, flow rate 400 μL/min.
$^a$Intra-day relative standard deviation (RSD) of retention times (n = 3 independent LC-MS measurements).

The separation of a more complex mixture involving the tetra- and pentasaccharides stachyose and verbascose was also attempted. However under these conditions, the separation of raffinose and stachyose proved not possible, with the tri- and tetrasaccharides presenting identical retention times ($t_R$=9.47 min). Furthermore, verbascose eluted at $t_R$=9.59 min, showing marginally improved retention compared to the raffinose and stachyose.

Separation of Disaccharide Isomers.

PGC packing materials have been demonstrated to be an excellent stationary phase chemistry for the discrimination of isomers or structurally related compounds. The separation of the disaccharide isomers trehalose and maltose using the AS1000 material as the stationary phase was attempted (FIG. 24). The LC-MS method developed by Antonio et al. was applied again for this separation and resulted in excellent resolution of the two disaccharide isomers. Analyte peak identification was based upon the use of standard solutions of the individual compounds, and structural information derived from ESI-QIT-MS detection.

Extracted ion chromatograms presented excellent peak shape, and near baseline resolution for the two compounds, under the conditions used. Trehalose eluted at $t_R$=4.73 min and maltose at $t_R$=7.73 min. Triplicate separation runs demonstrated the system to be repeatable. Comparison of retention times with Sucrose ($t_R$=6.88 min), suggest that partial resolution of all three disaccharide isomers may be possible. Separations were good and resolution comparable previously reported methods by Antonio et al. for similar compounds using the commercially available PGC phase.[i]

Thus the [resent disclosure describes the simple template free preparation of highly mesoporous low density alginic acid materials. The transformation of the non-porous alginic acid form into the highly mesoporous form is demonstrated by the present disclosure to be relatively straight forward, with, furthermore, the drying method (i.e. thermal or supercritical $CO_2$) providing a vector for material property manipulation. Materials prepared in accordance with the present disclosure presented large mesopore diameters (ca. 28 nm), with mesopore volumes in excess of 2 $cm^3g^{-1}$ for supercritically dried material. Electron microscopy and proximity data have demonstrated hierarchical pore structure. The resulting surface has also been shown to present bronsted acidity as established by FT-IR pyridine adsorption studies.

The porous alginic acid form may be converted directly, without the need for additive catalyst, into mesoporous carbonaceous equivalents. The present disclosure shows non-oxidative thermal self decomposition of expanded alginic acid which results in a maintenance of the mesopore majority, with marginal shrinkage in size and volume as result of heating to high temperatures (e.g. up to 1000° C.). Mesoprous volumes of 1 $cm^3g^{-1}$ were impressively typical. By preparation temperature selection, variable surface functionality or hydrophobicity may be accessed. XPS, TG, FT-IR and solid state NMR have been employed to characterise the chemical changes occurring during this thermal decomposition, revealing chemical transitions in, for example the 200-450° C. decomposition range.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of preparing a mesoporous carbonised material comprising:
   i) subjecting a polysaccharide to one or more procedures to form an expanded polysaccharide, the expanded polysaccharide possessing acidic functionality; and
   ii) subjecting the expanded polysaccharide to a thermal treatment;
   wherein the polysaccharide has a chemical structure which permits sufficient movement about the glycosidic linkage of the polysaccharide to form, in a fluid environment, an at least partly self-assembled mesoporous physical structure of the expanded polysaccharide material, and
   wherein the one or more procedures to form the expanded polysaccharide comprise mixing the polysaccharide with water and removing water from the polysaccharide via solvent exchange.

2. The method of claim 1, wherein the resulting mesoporous carbonised material has a $V_{meso}$ greater than 0.2 $cm^3/g$.

3. The method of claim 2, wherein the resulting mesoporous carbonised material has a $V_{meso}$ greater than 0.8 $cm^3/g$.

4. The method of claim 2, wherein the resulting mesoporous carbonised material has a $V_{meso}$ greater than 1 $cm^3/g$.

5. A method of preparing a mesoporous carbonised material comprising:
   i) subjecting a polysaccharide to one or more procedures to form an expanded polysaccharide, the expanded polysaccharide possessing acidic functionality; and
   ii) subjecting the expanded polysaccharide to a thermal treatment;
   wherein the polysaccharide has a chemical structure which permits sufficient movement about the glycosidic linkage of the polysaccharide to form, in the presence of water, an at least partly self-assembled mesoporous physical structure of the expanded polysaccharide material, and
   wherein the resulting mesoporous carbonised material has a $V_{meso}$ greater than 0.5 $cm^3/g$.

6. The method of claim 5, wherein the acidic functionality comprises an acidic functional group which is covalently bound to the expanded polysaccharide.

7. The method of claim 5, wherein the acidic functionality comprises a carboxyl or sulfate group.

8. The method of claim 5, wherein the expanded polysaccharide possessing acidic functionality is selected from the group consisting of alginic acid, pectin, carageenan and polysaccharides chemically modified to include an acidic functional group.

9. The method of claim 5, wherein the resulting mesoporous carbonised material comprises pores in the mesoporous and microporous size distribution ranges.

10. The method of claim 9, wherein the ratio of the mesoporous volume ($V_{meso}$) to microporous volume ($V_{micro}$) of the resulting mesoporous carbonised material is greater than 10, when calculated using the t-plot method.

11. The method of claim 9, wherein the ratio of the mesoporous volume ($V_{meso}$) to microporous volume ($V_{micro}$) of the resulting mesoporous carbonised material is greater than 10 and less than 500, when calculated using the t-plot method.

12. The method of claim 9, wherein the ratio of the mesoporous volume ($V_{meso}$) to microporous volume ($V_{micro}$) of the resulting mesoporous carbonised material is greater than 50 and less than 200, when calculated using the t-plot method.

13. The method of claim 9, wherein the resulting mesoporous carbonised material has a $V_{micro}$ of not more than 0.07 $cm^3/g$.

14. The method of claim 5, wherein the expanded polysaccharide is a self-assembled polysaccharide.

15. The method of claim 14, wherein the expanded polysaccharide is self-assembled into the form of a helical structure.

16. The method of claim 5, wherein the self-assembled physical structure is a helical structure.

17. The method of claim 5, comprising subjecting the expanded polysaccharide which possesses acidic functionality and one or more further expanded polysaccharides to the thermal treatment.

18. The method of claim 5, wherein the thermal treatment is such that the resulting mesoporous carbonised material is partially carbonised.

19. The method of claim 5, wherein the thermal treatment is such that the resulting mesoporous carbonised material is substantially carbonised.

20. The method of claim 5, wherein the thermal treatment comprises heating at a temperature in the range of from room temperature to about 1200° C.

21. The method of claim 20, wherein the thermal treatment comprises heating at a temperature in the range of from room temperature to about 700° C.

22. The method of claim 20, wherein the thermal treatment comprises heating at a temperature in the range of from room temperature to about 600° C.

23. The method of claim 20, wherein the thermal treatment comprises heating at a temperature in the range of from room temperature to about 450° C.

24. The method of claim 20, wherein the thermal treatment comprises heating at a temperature in the range of from room temperature to about 400° C.

25. The method of claim 20, wherein the thermal treatment comprises heating at a temperature in the range of from room temperature to about 320° C.

26. The method of claim 20, wherein the thermal treatment comprises heating at a temperature in the range of from room temperature to about 250° C.

27. The method of claim 20, wherein the thermal treatment comprises heating at a temperature of not less than 100° C.

28. The method of claim 5, wherein the thermal treatment is carried out in a non-oxidative atmosphere.

29. The method of claim 5, wherein the thermal treatment includes alternate heating stages and isothermal stages.

* * * * *